United States Patent
Fukumoto et al.

(10) Patent No.: US 6,507,605 B1
(45) Date of Patent: Jan. 14, 2003

(54) RAKE RECEIVER IN DIRECT SPREADING CDMA TRANSMISSION

(75) Inventors: Satoru Fukumoto, Kanagawa (JP); Mamoru Sawahashi, Kanagawa (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 09/380,008

(22) PCT Filed: Dec. 24, 1998

(86) PCT No.: PCT/JP98/05860

§ 371 (c)(1), (2), (4) Date: Aug. 24, 1999

(87) PCT Pub. No.: WO99/34546

PCT Pub. Date: Jul. 8, 1999

(30) Foreign Application Priority Data

Dec. 24, 1997 (JP) .............................................. 9-355907

(51) Int. Cl.[7] ............................. H04B 1/10; H04B 15/00
(52) U.S. Cl. ..................................... 375/152; 375/148
(58) Field of Search ................................ 375/140, 147, 375/148, 152, 143; 370/343, 342, 320, 335, 441

(56) References Cited

U.S. PATENT DOCUMENTS 5,757,845 A   5/1998   Fukawa ...................... 375/200

(List continued on next page.)

FOREIGN PATENT DOCUMENTS

| JP | WO95/22214 | 8/1995 |
| JP | 8-116303 | 5/1996 |
| JP | 08-181636 | 7/1996 |
| JP | 09-162847 | 6/1997 |
| JP | 10-190522 | 7/1998 |
| JP | 10-336072 | 7/1998 |
| WO | WO 95/22214 | 8/1995 |

OTHER PUBLICATIONS

Fukumoto, et al., "Matched Filter–Based RAKE Combiner for Wideband DS–CDMA Mobile Radio", IEICE Trans. Commun. vol. E81–B, No. 7, Jul., 1998.

(List continued on next page.)

*Primary Examiner*—Don N. Vo
*Assistant Examiner*—Dung X. Nguyen
(74) *Attorney, Agent, or Firm*—Brown Raysman Millstein Felder & Steiner, LLP

(57) ABSTRACT

A baseband spread modulation signal is input to a matched filter (131). The matched filter (131) despreads the spread modulation signal using the output of a spreading code replica generator (132). The matched filter (131) outputs the despread signals at L timings. The output signals are multiplied by multipliers (201) by corresponding weighting factors output from a weighting factor controller. The multiplied outputs are demodulated by demodulators (202), and RAKE combined by an adder (118). A data decision section (203) generates from the RAKE combined signal a data decision signal. An error signal generating section (204), receiving the RAKE combined output and the data decision signal, obtains an error signal. The weighting factor controller (205), carrying out such control that minimizes the error signal using the error signal and the despread signals fed from the matched filter (131), determines the weighting factors, and the multipliers (201) multiply the outputs of the matched filter (131) by the weighting factors. This makes it possible to RAKE combine multipath signals with reducing the effect of signals consisting of only noise or interference components.

22 Claims, 30 Drawing Sheets

U.S. PATENT DOCUMENTS 5,956,369 A * 9/1999 Davidovici et al. .......... 375/207
6,069,912 A * 5/2000 Sawahashi et al. .......... 375/142

OTHER PUBLICATIONS

B–5–22, Fukumoto, et al., "Performance of Matched Filter Based Pilot–Assisted RAKE Receiver with Two–Stage Multipath Selection Threshold For DS–CDMA", Proceedings of the 1997 Communications Society Conference of IEICE.

B–5–22, Fukumoto, et al., "Performance of Matched Filter–Based Pilot–Assisted RAKE Receiver Using Adpatively Controlled Weights for W–CDMA", Proceedings of the 1998 IEICE General Conference.

Fukumoto, et al., "Adapative Rake Combiner Based On Matched Filter For DS–CDMA Mobile Radio", pp. 64–68, APCC/ICCS '98.

* cited by examiner

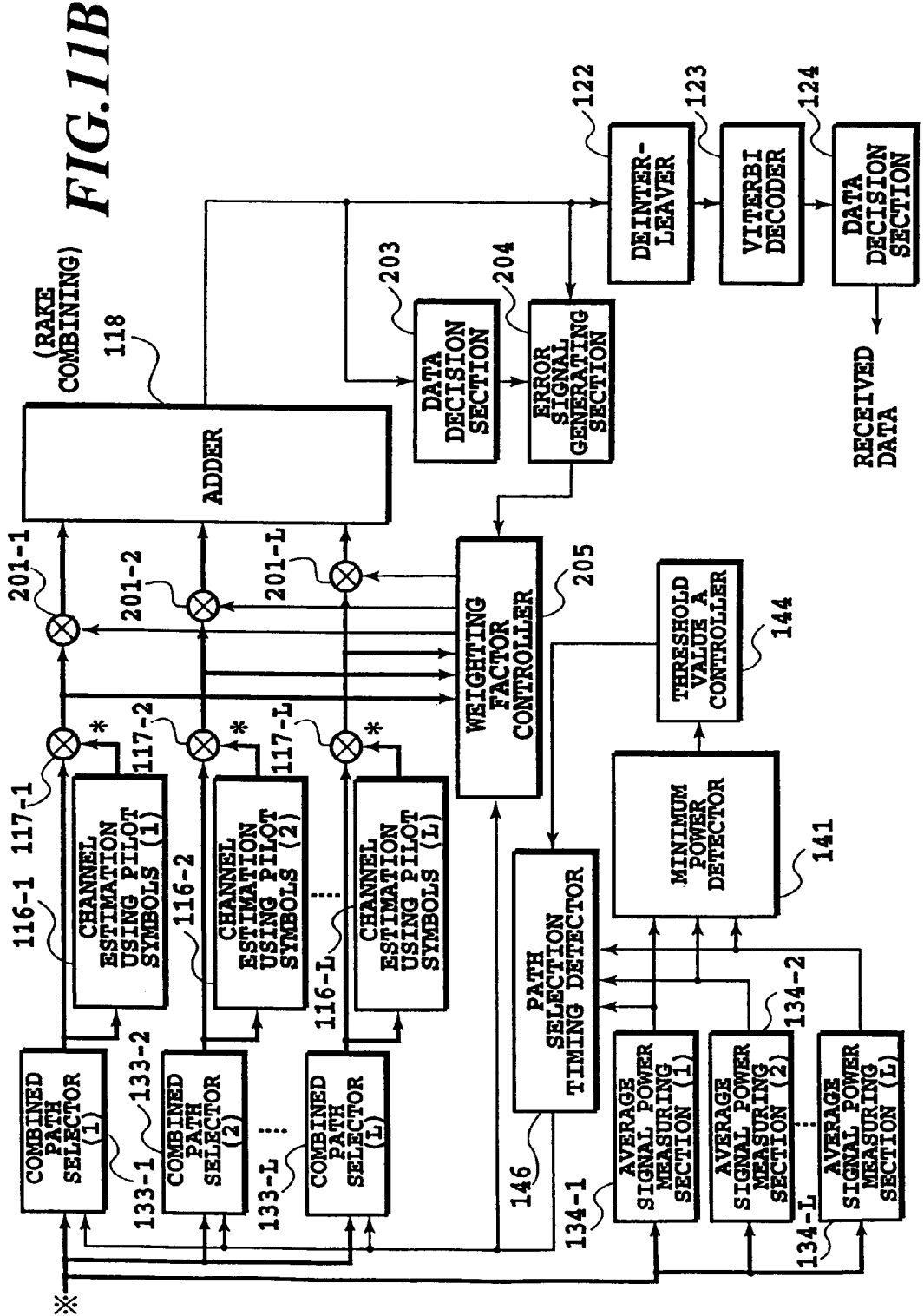

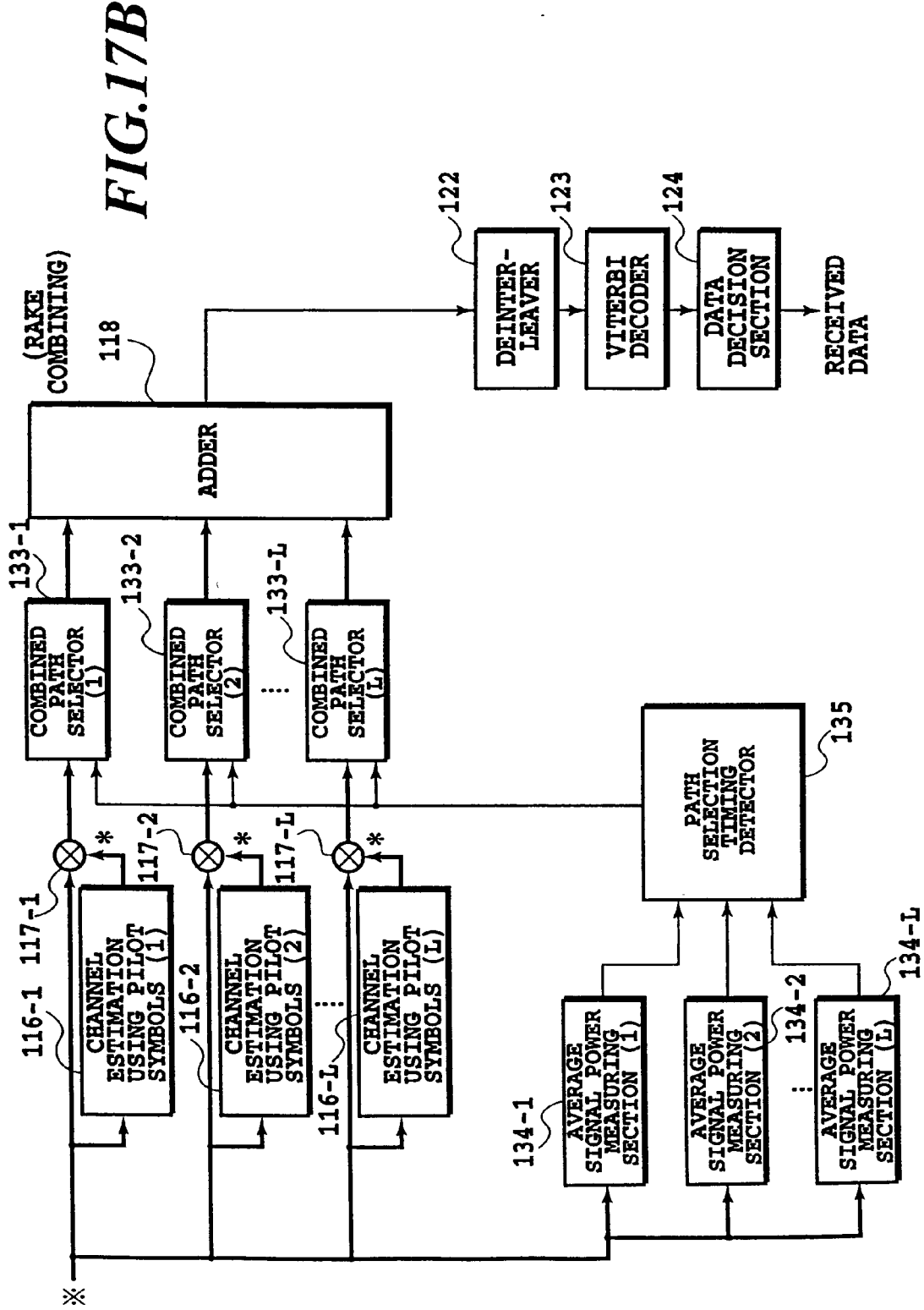

under the pilot symbols inserted into the transmitted information
RAKE RECEIVER IN DIRECT SPREADING CDMA TRANSMISSION This application is a national stage filing of PCT application no. PCT/JP98/05860, filed Dec. 24, 1998.

TECHNICAL FIELD

The present invention relates to a RAKE receiver in direct sequence CDMA (DS-CDMA) transmission system that carries out multiple access in a spread spectrum system in mobile communications.

BACKGROUND ART

The DS-CDMA transmission system, which transmits information data modulation signals by spreading them into wideband signals using spreading codes of a processing gain (the number of chips per symbol) pg, is a communication system that assigns different spreading codes to users to enable them to communicate using the same frequency band.

FIGS. 16A and 16B show a configuration of a receiver employing sliding correlators in a conventional DS-CDMA transmission system. In the block diagrams below including FIGS. 16A and 16B, although suffixes -1, -2, . . . , -L are attached to the same reference numerals that each designate L circuits provided in correspondence to L signal passages, only the same reference numerals are used in the following description.

In the configuration as shown in FIGS. 16A and 16B, a spread modulation signal received by an antenna 101 is amplified by a low noise amplifier 103 after passing through a bandpath filter 102, and then undergoes frequency conversion into an intermediate frequency (IF) signal using a mixer 104, an oscillator 105 and a bandpass filter (BPF) 106, followed by linear amplification by an automatic gain control amplifier (AGC amplifier) 107. Subsequently, a square-law detector 108 detects the envelope of the amplitude of the received signal, and amplitude fluctuations are negatively fed back to the AGC amplifier 107 to compensate for the amplitude fluctuations caused by fading. The linearly amplified signal by the AGC amplifier 107 undergoes quadrature detection by a quadrature detector 109, resulting in a pair of baseband signals. The in-phase (I) and quadrature (Q) components are converted into digital values by A/D converters 112 and 113. Replica generators 115 generate spreading code replicas synchronized with delay times of multipath signals to be RAKE combined. Sliding correlators 114 despread using the spreading code replicas the spread modulation signal converted into the digital values. Channel estimators 116 and multipliers 117 carry out differentially coherent detection or coherent detection of the despread signals to demodulate the data. An adder 118 carries out RAKE combining of the demodulation outputs, and a deinterleaver 122 deinterleaves the output of the adder 118. A Viterbi decoder 123 decodes the output of the deinterleaver, and a data decision section or data restoring section 124 carries out hard decision to restore the received data.

In the conventional example as shown in FIGS. 16A and 16B, the absolute coherent demodulation scheme will be explained which is carried out by inserting pilot symbols into information symbols at fixed intervals. In land mobile communications, the received signal undergoes amplitude and phase fluctuations called fading because of changes in relative locations of a base station and a mobile station. In view of this, the channel estimators 116 estimate the complex envelopes, that is, the amplitude and phase fluctuations (or channels) caused by fading when the receiver carries out the coherent detection modulation. The channel estimators obtain received complex fading envelopes associated with the pilot symbols inserted into the transmitted information symbols at the fixed intervals, and then obtain the complex fading envelopes at individual information symbols between the pilot symbols. The multipliers 117 compensates for the fluctuations of the complex fading envelopes (channel fluctuations) of the individual information symbols using the values associated with the pilot symbols. The adder 118 carries out in-phase combining (RAKE combining) of multipath signals whose channel fluctuations are compensated for, thereby improving the ratio of the signal power to interference signals or thermal noise.

Selection of the multipath signals to be RAKE combined is carried out by the sliding correlators 114 which are called search fingers, in which average received signal powers of despread signals are measured at U timings in a multipath search range, and multipaths with great average received signal powers are selected. For example, when a single sliding correlator 119 is used, a correlation value (despread value) at one timing per symbol is selected so that the received signal power of the despread signal is selected at this timing. Sliding the timing of the spreading code one by one enables the power measurement to be achieved for the total of U timings.

Thus, selection of the paths to be RAKE combined requires to choose the multipath signals with great average signal power (after undergoing the fluctuations due to shadowing and relative location changes between the base station and the mobile station). On the other hand, under a land mobile communication environment, there are instantaneous fluctuations caused by Rayleigh fading. Accordingly, some multipaths may be missing from the paths to be RAKE combined because their received signal power may happen to be dropped due to the Rayleigh fading and has small signal power.

To circumvent the effect of such instantaneous fluctuations of the received power, the received signal power of the signals must be measured after averaging the Rayleigh fading fluctuations. To achieve this, the signal power measurement of the despread signals is iterated V times at U timings in the multipath search range, and delay profiles are formed from the average signal powers to select W greatest multipaths to be RAKE combined. Forming each delay profile by a single sliding correlator requires U×V symbol time, and forming an average delay profile by f sliding correlators (search fingers) require (U×V)/f symbol time. The timings of the spread code replicas used in the RAKE combining fingers are updated every time the delay profile is generated. When the mobile station moves fast with respect to the base station, the delay profiles fluctuate quickly. Accordingly, the multipath search using the sliding correlators, which take a rather long time, cannot follow the fluctuations of the delay profiles sometimes. Although fast multipath search may be possible by reducing the multipath search range and the number of times of the averaging, the reduction in the multipath search range will reduce the time diversity effect of the RAKE combining, and the reduction in the number of times of averaging the signal power will impair the accuracy of the RAKE combined multipath selection by the search fingers.

FIGS. 17A and 17B show as a related art (not as a prior art) a configuration of a receiver employing a matched filter in the DS-CDMA transmission system, which the assignee of the present invention proposed in Japanese patent application laid-open No. 10-190522 (laid open on Jul. 21, 1998) (that is, Japanese patent application No. 8-346025 filed on Dec. 25, 1996). In the configuration as shown in FIGS. 17A and 17B, a spread modulation signal received is amplified by the low noise amplifier 103, and then undergoes frequency conversion into the IF signal. The IF signal is fed to the AGC amplifier 107, and then to the square-law detector 108 that controls the amplifier 107 to compensate for the amplitude fluctuations caused by fading. Then, the amplifier output is fed to the quadrature detector 109 to undergo quadrature detection. The baseband signals output from the quadrature detector 109 are fed through the low-pass filters 110 and 111 to the A/D converters 112 and 113 to be converted into digital signals. A matched filter 131, which has pg taps, despreads using the output of a spreading code replica generator 132 the spread modulation signal converted into digital values, thereby dividing it into L timing signals, where L=pg×s, where s is the number of over samplings per chip. From among the L timings, W multipaths are selected, and the data demodulation is carried out by the differentially coherent detection, or by the coherent detection.

In this example, a scheme is used which carries out the absolute coherent detection demodulation using pilot symbols inserted into information symbols at fixed intervals in transmission frames. Channel estimators 116, which receive despread signals at L timings, respectively, estimate the channels using the pilot symbols, and supply the estimates to the multipliers 117. The multipliers 117 multiply the estimates by the outputs of the matched filter 131, thereby compensating for the channel fluctuations of the individual information symbols. On the other hand, average signal power measuring sections 134 measure the average received signal powers at L timings, and generate an average delay profile. A path selection timing detector 135 detects the maximum signal power of the profile obtained, and using the maximum signal power and a threshold decision gain, determines a threshold value for selecting the paths to be RAKE combined. Combined path selectors 133 select W greatest RAKE combined paths with signal powers higher than the threshold value. In this case, although the multipaths are selected from among the timings with large received power, the same multipath detected by the over sampling is excluded, and the next multipath is selected. The signals selected are combined by the adder 118 functioning as the RAKE combiner. The signal obtained by the RAKE combining is deinterleaved by the deinterleaver 122 and is decoded by the Viterbi decoder 123.

In the configuration employing the matched filter, despread signals are output at L timings per symbol period. This obviates the power measurement through the search fingers using the sliding correlators 119 as in the configuration as shown in FIGS. 16A and 16B. In addition, the update of the multipaths for the RAKE combining can be achieved quickly.

As described before, the delay profiles fluctuate and the number of multipath varies as the mobile station moves with respect to the base station. The configuration of FIGS. 17A and 17B, however, is arranged such that only the greatest W multipaths are combined. Thus, even if the number of the multipaths is greater than W, the ratio of the signal power to interference components and thermal noise cannot be improved by combining all the multipaths. Besides, when the number of the multipaths is less than W, the characteristic of the receiver will be degraded by combining multipath signals of low signal power, signals consisting of only noise components or interference components, or multipaths with very low received power.

FIGS. 18A and 18B show as a related art (not as a prior art) another configuration of a receiver employing a matched filter in the DS-CDMA transmission system, which the assignee of the present invention proposed in Japanese patent application No. 9-144167 (filed on Jun. 2, 1997), and published under the title of "Matched Filter-based RAKE Combiner for Wideband DS-CDMA Mobile Radio" (in IEICE TRANS. COMMUN. VOL. E81-B, NO. 7, JULY, 1998). In the configuration as shown in FIGS. 18A and 18B, the received spread modulation signal is amplified by the low noise amplifier 103, followed by the frequency modulation into the IF frequency by the circuits 104, 105 and 106. The IF signal is fed to the AGC amplifier 107, and the square-law detector 108 controls the amplifier 107 to compensate for the amplitude fluctuations caused by the fading. Subsequently, the amplifier output is fed to the quadrature detector 109 to undergo the quadrature detection. The baseband signals output from the quadrature detector 109 pass through the low-pass filters 110 and 111, and are converted into digital signals by the A/D converters 112 and 113. The matched filter 131, which has pg taps, despreads the signals converted into digital values, thereby outputting L(=pg×s) signals, where s is the number of over samplings per chip. From among the L timings, W multipaths are selected, and the data demodulation is carried out by the differentially coherent detection, or by the coherent detection.

In this example, $N_p$ pilot symbols are inserted into every $N_s$ information symbol intervals in the transmission frames, and a scheme is used which carries out the absolute coherent detection demodulation using the pilot symbols. The channel estimators 116, which receive despread signals at L timings, respectively, estimate the channels using the pilot symbols, and supply the estimates to the multipliers 117. The multipliers 117 multiply the estimates by the output of the matched filter 131, thereby compensating for the channel fluctuations of the individual information symbols. The average signal power measuring sections 134 measure the average received signal powers at L timings, and generate an average delay profile. The average signal power measurement is carried out using the pilot symbols, for example. A minimum power detector 141 and a maximum power detector 142 selects, from the average received powers at L timings obtained by the average signal power measuring sections 134, minimum signal power and maximum signal power, respectively. A threshold value A controller 144 obtains a threshold value A using the minimum signal power detected, and a threshold value B controller 145 obtains a threshold value B using the maximum signal power detected. The threshold values A and B are obtained by multiplying the minimum signal power and the maximum signal power by different gains. A path selection timing detector 146 compares the outputs of the average signal power measuring sections at the L timings with the threshold values A and B. and detects timings providing the average signal powers equal to or greater than the threshold values A and B. Then, beginning from the timing providing the greatest signal power, the timings of the multipaths are sequentially detected. Specifically, excluding signals within a range of ±k (k is a natural number) timings with respect to the multipath timings that are already selected, the path selection timing detector 146 sequentially detects the next multipath timings. The combined path selectors 133, receiving timings output from the detector 146 and the outputs of the multipliers 117, select the demodulator outputs at the multipath timings detected. The signals selected are combined by the RAKE combiner 118. The signal obtained by the RAKE combining is deinterleaved by the deinterleaver 122 and is decoded by the Viterbi decoder 123.

This configuration, which selects the multipaths to be RAKE combined with reference to the two threshold value, can combine only the signals with effective signal power, thereby reducing the effect of the signals consisting of noise and interference. In addition, even when the number of effective multipaths varies because of the fluctuations of the delay profiles, the multipaths satisfying the threshold values can be combined. The fixed threshold values in this configuration are effective to the delay profile of particular forms and particular fluctuations. The form and variation of the delay profile, however, are diversified in actual mobile communication environments, which will hinder the RAKE combining of the effective signals when the fluctuations of the delay profile cannot be followed, or will impair the characteristics of the receiver because of the rather large effect of the noise and interference components.

DISCLOSURE OF THE INVENTION

An object of the present invention is to provide a RAKE receiver capable of combining effective paths even when the number of multipaths varies because of the fluctuations of the delay profiles.

More specifically, the object of the present invention is to provide a RAKE receiver capable of carrying out effective RAKE combining by always selecting effective multipaths by following the dynamic fluctuations of the delay profile by adaptively controlling weighting factors such that MSE (Minimum Square Error) becomes minimum (MMSE) and by using these weighting factors.

Another object of the present invention is to provide a RAKE receiver which can reduce the convergence time of the MMSE by determining initial values of the weighting factors.

Still another object of the present invention is to provide a RAKE receiver capable of improving the characteristics of its receiving quality through time diversity effect by RAKE combining of the wideband DS-CDMA with high chip rate.

MEANS FOR SOLVING THE PROBLEMS

In order to achieve the above-described objects, according to the invention of claim 1, a RAKE receiver in a direct sequence CDMA transmission system for carrying out multiple access transmission by spreading information data into a wideband signal using a spreading code, comprises: a spreading code replica generator for generating spreading code replicas; a matched filter having a plurality of taps for despreading a received spread modulation signal by using the outputs of the spreading code replica generator; a weighting factor controller for controlling weighting factors corresponding to the outputs of the matched filter by using the respective despread signals fed from the matched filter and an output of an error signal generator in such a manner that the output of the error signal generator becomes minimum; multipliers for multiplying the respective despread signals fed from the matched filter by the corresponding weighting factors fed from the weighting controller; demodulators for demodulating individual signals fed from the multipliers; an adder for combining the signals fed from the demodulators; a data decision section for performing data decision with respect to the output of the adder; and the error signal generator for calculating a difference between the output of the adder and the output of the data decision section so as to generate an error signal.

According to the invention of claim 2, a RAKE receiver in a direct sequence CDMA transmission system for carrying out multiple access transmission by spreading information data into a wideband signal using a spreading code, comprises: a spreading code replica generator for generating spreading code replicas; a matched filter having a plurality of taps for despreading a received spread modulation signal by using the outputs of the spreading code replica generator; demodulators for demodulating individual despread signals fed from the matched filter; a weighting factor controller for controlling weighting factors corresponding to the respective outputs of the demodulators in such a manner that an output of an error signal generator becomes minimum; multipliers for multiplying the respective demodulated signals fed from the demodulators by the corresponding weighting factors fed from the weighting factor controller; an adder for combining the outputs of the multipliers; a data decision section for performing data decision with respect to the output of the adder; and the error signal generator for calculating a difference between the output of the adder and the output of the data decision section so as to generate an error signal.

According to the invention of claim 3, a RAKE receiver as claimed in claim 1 or claim 2 comprises:

a signal power measuring section for measuring average received signal powers of the respective outputs of the matched filter; a minimum power detector for detecting a minimum signal power based on the outputs of the average signal power measuring section; a threshold value controller A for determining and outputting a threshold value A for selecting signals to be combined in the adder based on the output of the minimum power detector; a path selection detector for comparing the outputs of the average signal power measuring section with the output of the threshold value controller, so as to detect signals, received powers of which are equal to or greater than the threshold value A; and a combined path selector for selecting signals corresponding to the signals detected by the path selection detector from among the despread signals fed from the matched filter.

According to the invention of claim 4, in a RAKE receiver as claimed in claim 3, the weighting factor controller controls only the weighting factors corresponding to the signals detected by the path selection timing detector when the weighting factor controller determines the weighting factors.

According to the invention of claim 5, a RAKE receiver as claimed in claim 1 or claim 2 comprises:

a signal power measuring section for measuring average received signal powers of the respective outputs of the matched filter; a minimum power detector for detecting a minimum signal power based on the outputs of the average signal power measuring section; a maximum power detector for detecting a maximum signal power based on the outputs of the average signal power measuring section; a threshold value controller A for determining and outputting a threshold value A for setting initial values of the weighting controller based on the output of the minimum power detector; a threshold value controller B for determining and outputting a threshold value B for setting initial values of the weighting controller based on the output of the maximum power detector; an effective path detector for comparing the outputs of the average signal power measuring section with the output of the threshold value controller A and with the output of the threshold value controller B so as to detect signals, signal powers of which are equal to or greater than the threshold value A and the threshold value B; and an initial weighting factor setting section for placing initial values of the weighting factors corresponding to the signals detected by the effective path detector at a, where 1 ÅÜ a>0, and for placing initial values of the weighting factors corresponding to the remaining signals at zero.

According to the invention of claim 6, a RAKE receiver as claimed in claim 3 or claim 4 comprises: a maximum power detector for detecting a maximum signal power based on the outputs of the average signal power measuring section; a threshold value controller B for determining and outputting a threshold value B for setting initial values of the weighting controller based on the output of the maximum power detector; an effective path detector for comparing the outputs of the average signal power measuring section with the output of the threshold value controller A and with the output of the threshold value controller B so as to detect signals, signal powers of which are equal to or greater than the threshold value A and the threshold value B; and an initial weighting factor setting section for placing initial values of the weighting factors corresponding to the signals detected by the effective path detector at a, where 1 ÅÜ a>0, and for placing initial values of the weighting factors corresponding to the remaining signals at zero.

According to the invention of claim 7, in a RAKE receiver as claimed in claim 5 or claim 6, the weighting factor controller sets the values determined by the initial weighting factor setting section as the initial values of the weighting factors corresponding to the signals in setting the initial values of the weighting factors.

According to the invention of claim 8, in a RAKE receiver as claimed in any one of claims 1 to 7, the weighting factor controller, in controlling the weighting factors, unconditionally places at zero the weighting factors at ±k timings before and after a timing of the matched filter providing the maximum weighting factor, where k is a natural number, and sequentially determines the weighting factors by detecting a timing providing the second maximum weighting factor.

The RAKE receiver in accordance with the present invention can reduce the effect of signals consisting of only noise or interference components because it performs the RAKE combining after weighting all the signals a matched filter despreads at the entire timings by the weighting factors that are subjected to MMSE control.

Furthermore, according to the present invention, even if the number of the multipaths varies because of the fluctuations in the delay profile, only effective paths can be combined. This has an advantage of being able to RAKE combine only the effective multipaths following the fluctuations in the delay profile.

Moreover, according to the present invention, because the average received powers of the despread signals are measured at all timings, and threshold value or values are set from the measured results, the effect of the noise or interference can be further reduce. Besides, the convergence time of the MMSE can be reduced because the initial values of the weighting factors based on the MMSE control can be determined in advance.

In addition, according to the present invention, improvement in the characteristics of receiving quality can be implemented by the time diversity effect of the RAKE combining in a high chip rate, wideband DS-CDMA.

BRIEF DESCRIPTION OF THE DRAWINGS

FIGS. 11A and 11B are block diagrams showing a configuration of a DS-CDMA receiver employing the embodiments 2 and 3 in accordance with the present invention;

FIGS. 17A and 17B are block diagrams showing a configuration of a DS-CDMA receiver employing a matched filter, which the assignee of the present invention applied for a patent;

BEST MODE FOR CARRYING OUT THE INVENTION

Embodiments in accordance with the invention will now be described with reference to the accompanying drawings.

EMBODIMENT 1

Figure 1:
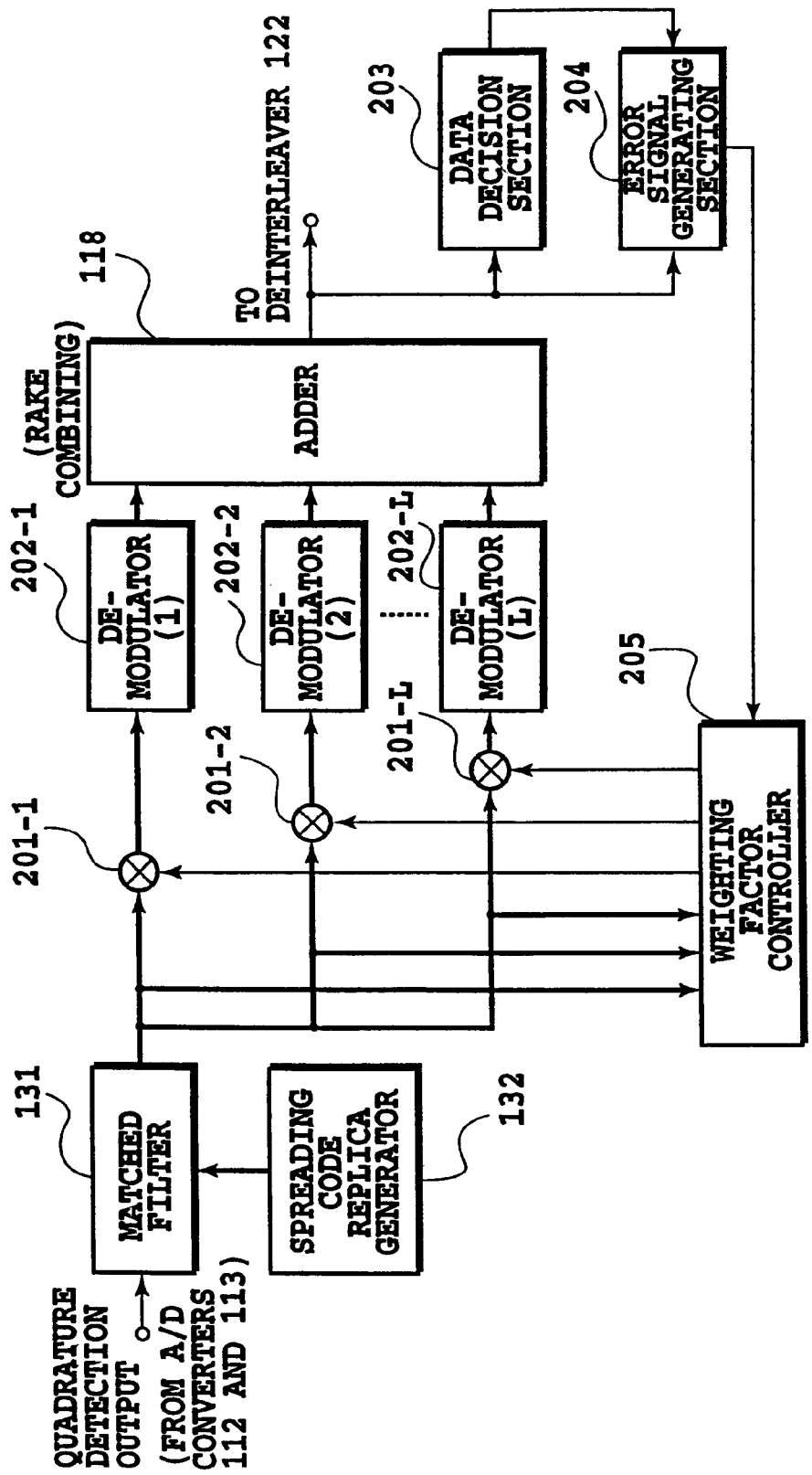
FIG. 1 is a block diagram showing a configuration of an embodiment 1 in accordance with the present invention.

FIG. 1 shows a principle of the embodiment 1 in accordance with the present invention. A baseband spread modulation signal which undergoes quadrature detection (whose I and Q components are generically indicated by one line here) and A/D conversion is supplied to a matched filter 131 having pg taps. The matched filter 131 despreads the spread modulation signal using the output of a spreading code replica generator 132, and outputs despread signals at L (=pg×s) timings, where s is the number of over samplings per chip. The signals despread at L timings and weighting factors at the individual timings of weighting factor controller outputs are supplied to multipliers 201 to be multiplied. The weighted outputs of the matched filter 131 at the L timings, that is, the outputs of the multipliers 201 are each demodulated by demodulators 202, and RAKE combined by an adder 118. The RAKE combined signal is fed to a deinterleaver 122 and a data decision section 203 that carries out hard decision of the data and generates a reference signal. The data decision section 203 can output an average of a plurality of pilot symbols as the reference signal. An error signal generating section 204 obtains the difference between the RAKE combined signal and the data decision signal (reference signal), and generates an error signal (MSE). A weighting factor controller 205, which carries out such control that the error signal becomes minimum (MMSE) using the error signal and the despread signals at L timings fed from the matched filter 131, determines weighting factors at L timings, and supplies them to the multipliers 201 so as to selectively assign weights to the despread signals fed from the matched filter 131.

In the present embodiment 1, the entire signals despread at all the timings by the matched filter are weighted by the MMSE controlled weighting factors, and then RAKE combined. Applying the present embodiment 1 makes it possible to RAKE combine the multipath signals with reducing the effect of signals consisting of only noise or interference components.

EMBODIMENT 2

Figure 2:
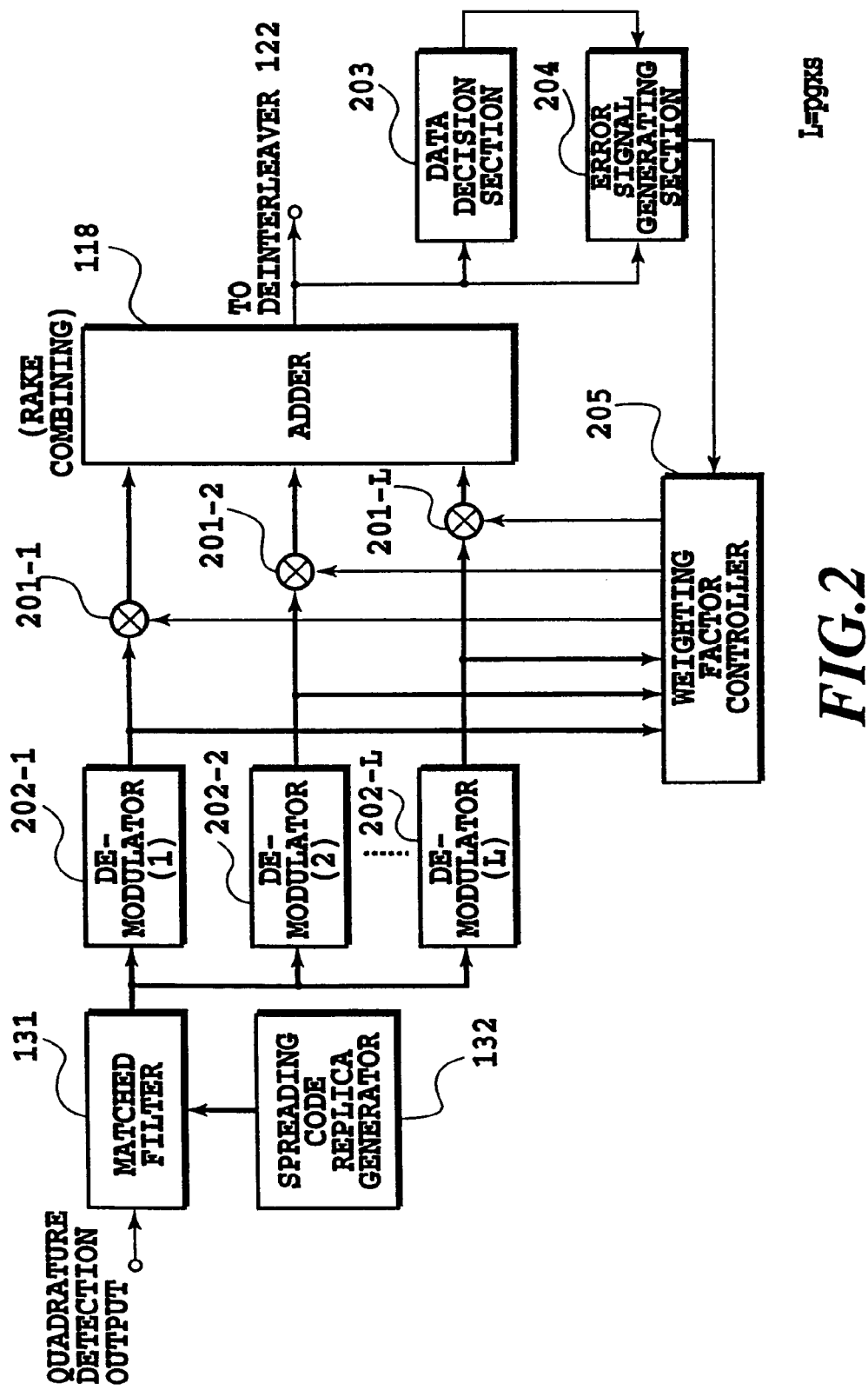
FIG. 2 is a block diagram showing a configuration of an embodiment 2 in accordance with the present invention.

FIG. 2 shows a principle of the embodiment 2 in accordance with the present invention. The baseband spread modulation signal which undergoes quadrature detection and A/D conversion is supplied to the matched filter 131 having pg taps. The matched filter 131 despreads the spread modulation signal using the output of the spreading code replica generator 132, and outputs despread signals at L (=pg×s) timings, where s is the number of over samplings per chip. The signals despread at L timings are each demodulated by demodulators 202. The output signals of the demodulators 202 at L timings and weighting factors at individual timings of the weighting factor controller 205 are supplied to the multipliers 201 to be multiplied. The weighted outputs of the demodulators 202 at the L timings, that is, the outputs of the multipliers 201 are RAKE combined by the adder 118. The data decision section 203 generates a data decision signal (reference signal) based on the RAKE combined signal. The error signal generating section 204 obtains the difference between the RAKE combined signal and the data decision signal, and generates the error signal (MSE). The weighting factor controller 205, which carries out such control that the error signal becomes minimum (MMSE) using the error signal and the despread signals at the L timings fed from the demodulators 202 determines weighting factors at the L timings, and supplies them to the multipliers 201 so as to selectively assign weights to the despread signals fed from the demodulators 202.

In the present embodiment 2, as in the embodiment 1, the entire signals despread at all the timings by the matched filter are weighted by the MMSE controlled weighting factors, and then RAKE combined. Applying the present embodiment 2 makes it possible to RAKE combine the multipath signals with reducing the effect of signals consisting of only noise or interference components.

EMBODIMENT 3

Figure 3:
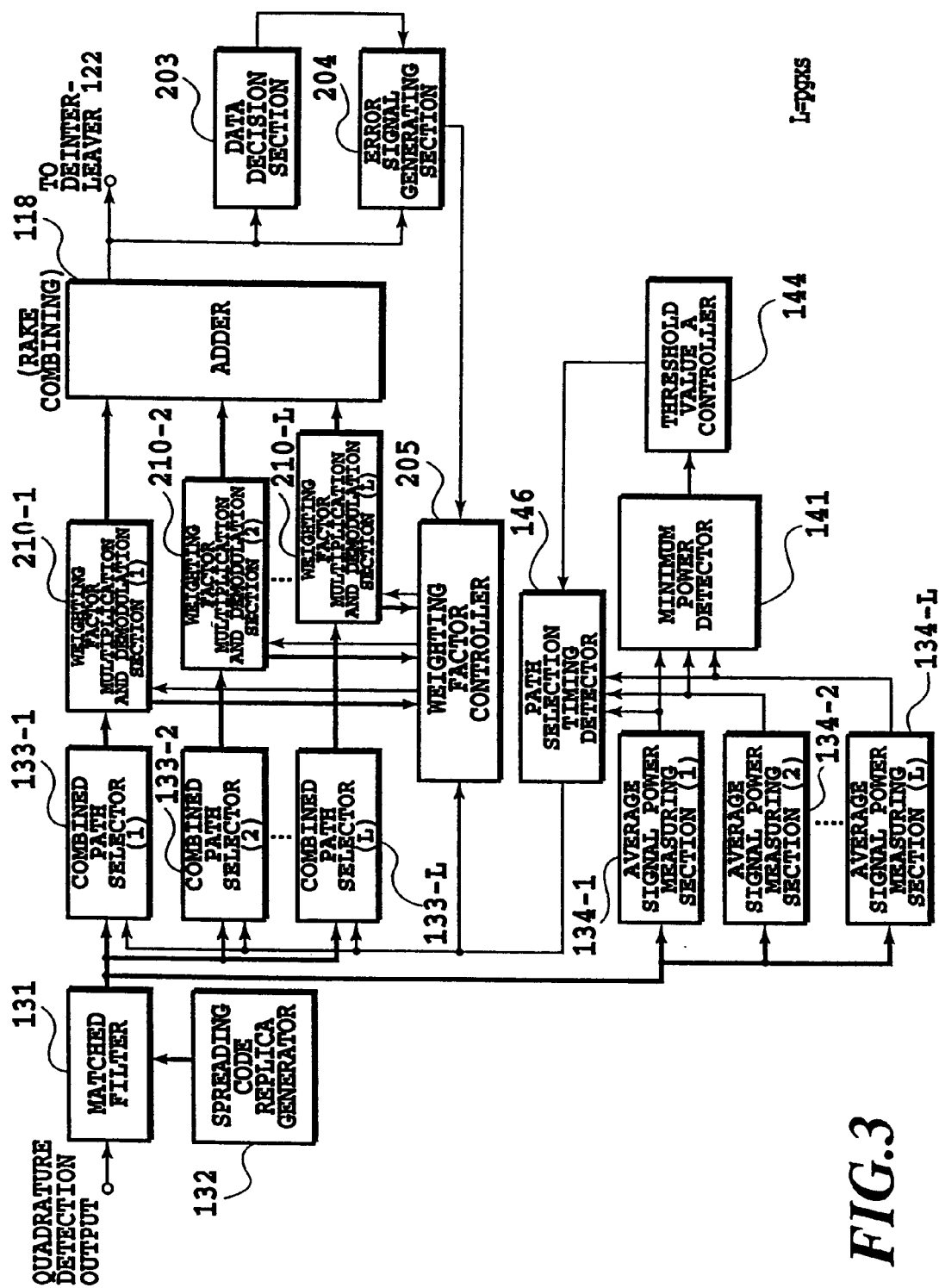
FIG. 3 is a block diagram showing a configuration of an embodiment 3 in accordance with the present invention.

FIG. 3 shows a principle of an embodiment 3 in accordance with the present invention. The baseband spread modulation signal passing through the quadrature detection and A/D conversion is supplied to the matched filter 131 with pg taps. The matched filter 131 despreads the spread modulation signal using the spreading code replica generator 132, thereby outputting despread signals at L timings. Receiving the outputs of the matched filter 131, average signal power measuring sections 134 each measure the average signal power at one of the L timings. A minimum power detector 141 detects minimum signal power at the L timings. A threshold value A controller 144 obtains a threshold value A using the minimum signal power. Here, the threshold value A is a value for avoiding to combine signals consisting of only noise or interference components.

A path selection timing detector 146, comparing the average signal powers at the L timings fed from the measuring sections 134 with the threshold value A, detects the timings at which the average signal powers exceed the threshold value A. The detected timings are supplied to a combined path selectors 133 that select the outputs of the matched filter 131 at those timings. The outputs of the matched filter 131 selected by the selectors 133 are fed to weighting factor multiplication and demodulation sections 210 which weight them by the outputs from the weighting factor controller 205, and then demodulate them, followed by the RAKE combining by the adder 118. The data decision section 203 generates the data decision signal from the RAKE combined signal. The error signal generating section 204 obtains the difference between the RAKE combined signal and the data decision signal, and generates the error signal (MSE). The weighting factor controller 205, performing MMSE control using the error signal and the despread signals fed from the weighting factor multiplication and demodulation section 210 at the timings the path selection timing detector 146 detects, determines the weighting factors for the timings detected.

Thus, the present embodiment 3 measures the average signal powers of the despread signals at all the timings, sets the threshold values from the measured results, and RAKE combines the signals above the threshold value. This makes it possible to further reduce the effect of the noise or interference.

EMBODIMENT 4

Figure 4:
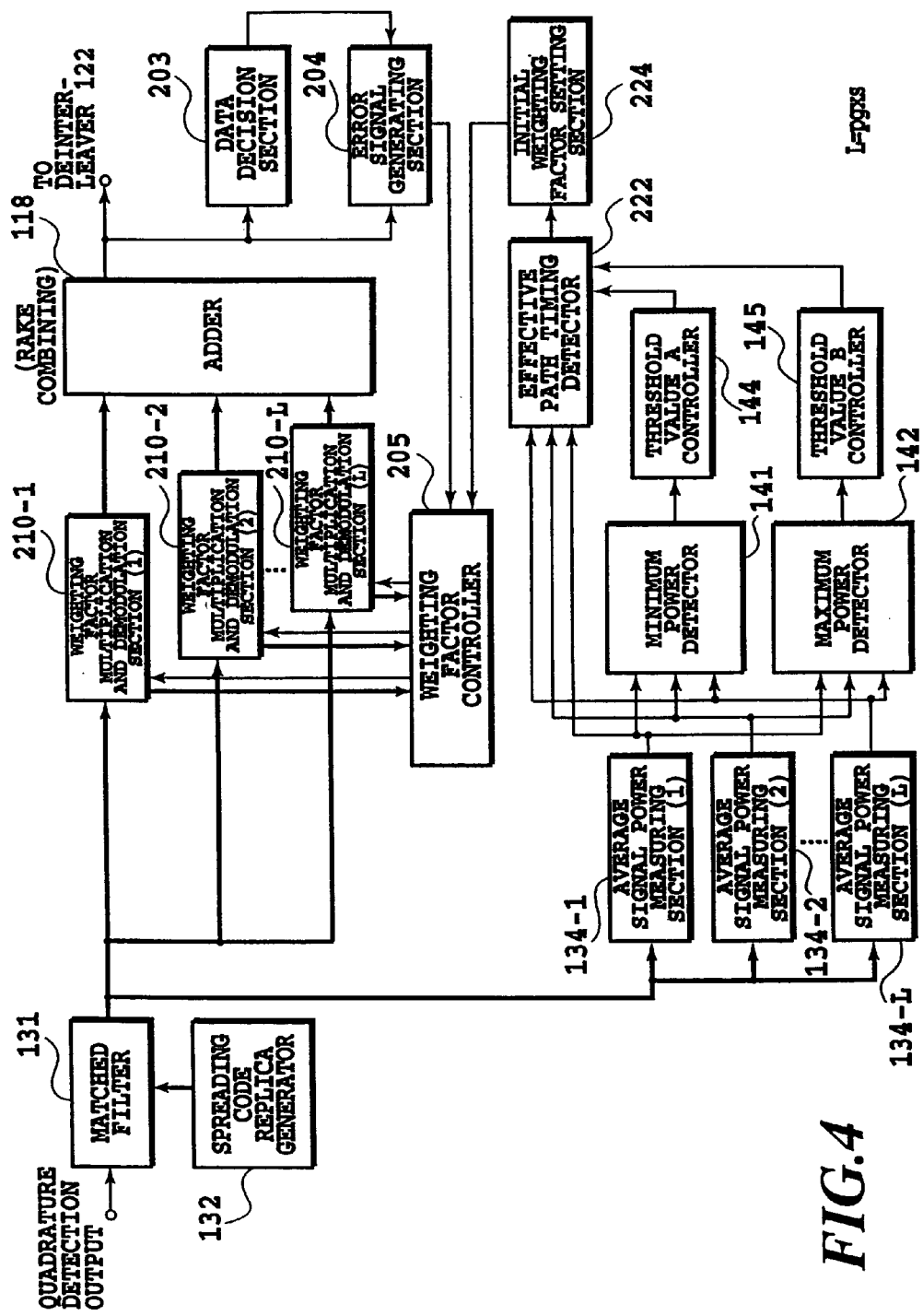
FIG. 4 is a block diagram showing a configuration of an embodiment 4 in accordance with the present invention.

FIG. 4 shows a principle of an embodiment 4 in accordance with the present invention. The baseband spread modulation signal passing through the quadrature detection and A/D conversion is supplied to the matched filter 131 with pg taps. The matched filter 131 despreads the spread modulation signal using the output of the spreading code replica generator 132, thereby outputting despread signals at L timings. Receiving the outputs of the matched filter 131, the average signal power measuring sections 134 each measure the average signal power at the individual L timings. The minimum power detector 141 and maximum power detector 142 detect the minimum signal power and maximum signal power at the L timings. The threshold value A controller 144 obtains the threshold value A using the minimum signal power detected. A threshold value B controller 145 obtains a threshold value B using the maximum signal power detected. Here, the threshold value A is a value for avoiding to combine signals consisting of only noise or interference components, and the threshold value B is a value for selecting signals with sufficient signal power.

An effective path timing detector 222, comparing the average signal powers at the L timings with the threshold values A and B, detects the timings at which the average signal powers exceed the greater one of the threshold values A and B. An initial weighting factor setting section 224 sets at one the initial values of the weighting factors at the timings detected by the effective path timing detector 222, and the initial values of the weighting factors at the remaining timings at zero.

The outputs of the matched filter 131 at the L timings are fed to the weighting factor multiplication and demodulation sections 210 which weight them by the outputs from the weighting factor controller 205, and then demodulate them, followed by the RAKE combining by the adder 118. The data decision section 203 generates the data decision signal from the RAKE combined signal. The error signal generating section 204 obtains the difference between the RAKE combined signal and the data decision signal, and generates the error signal (MSE). The weighting factor controller 205 starts the MMSE control for the values, which are determined by the initial weighting factor setting section 224, by using the error signal and the despread signals fed from the weighting factor multiplication and demodulation sections 210 at the L timings, and determines the weighting factors for the L timings.

Thus, the present embodiment 4 assigns weights, using the MMSE controlled weighting factors, to the signals despread by the matched filter at all the timings, followed by the RAKE combining. This makes it possible to RAKE combine the multipath signals with reducing the effect of the noise or interference. Besides, the convergence time of the MMSE can be reduced because the MMSE control can determine the initial values of the weighting factors.

EMBODIMENT 5

Figure 5:
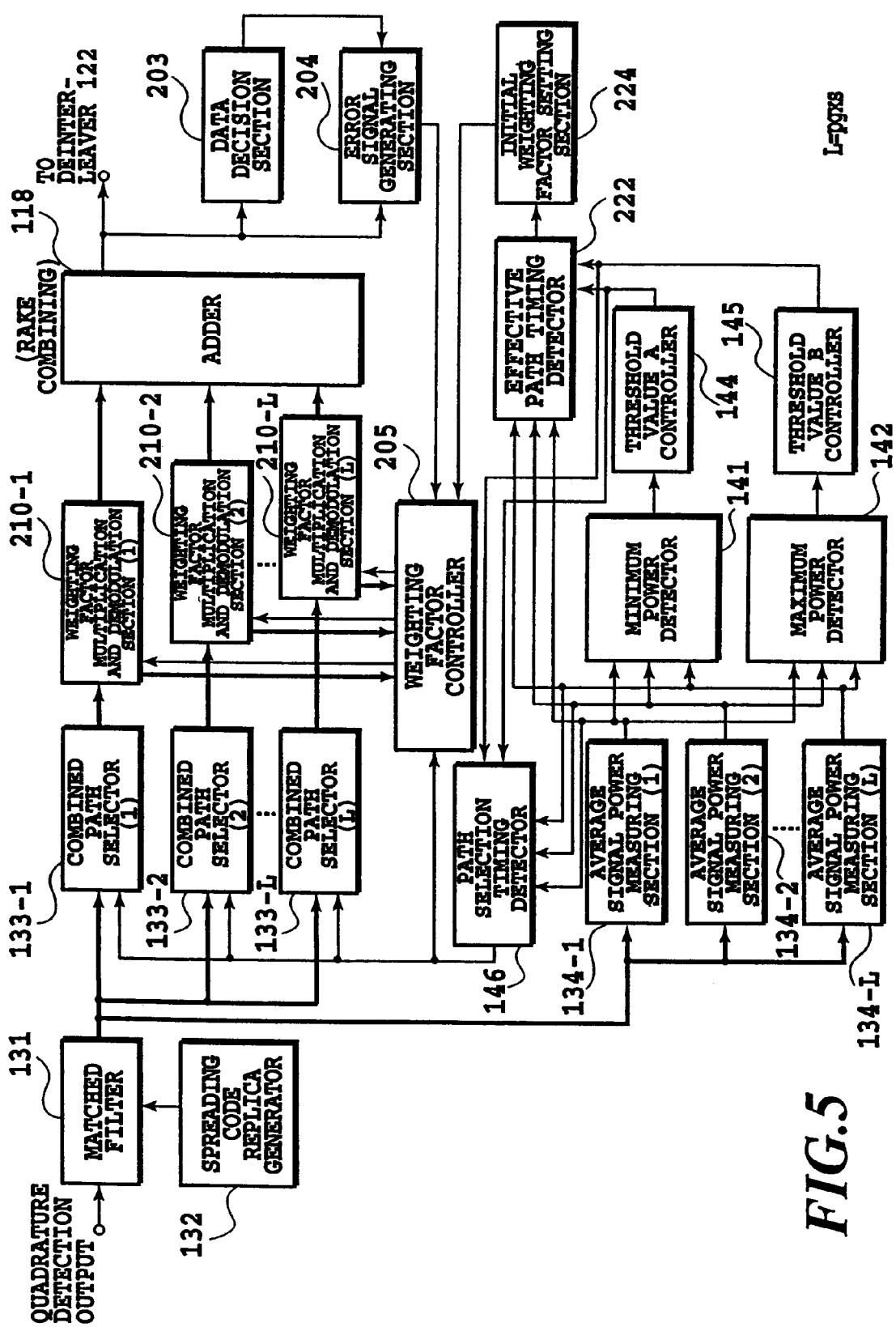
FIG. 5 is a block diagram showing a configuration of an embodiment 5 in accordance with the present invention.

FIG. 5 shows a principle of an embodiment 5 in accordance with the present invention. The baseband spread modulation signal passing through the quadrature detection and A/D conversion is supplied to the matched filter 131 with pg taps. The matched filter 131 despreads the spread modulation signal using the output of the spreading code replica generator 132, thereby outputting despread signals at L timings. Receiving the outputs of the matched filter 131, the average signal power measuring sections 134 measure the average signal powers at the L timings, respectively. The minimum power detector 141 and maximum power detector 142 detect the minimum signal power and maximum signal power at the L timings. The threshold value A controller 144 obtains the threshold value A using the minimum signal power detected. The threshold value B controller 145 obtains the threshold value B using the maximum signal power detected. Here, the threshold value A is a value for avoiding to combine signals consisting of only noise or interference components, and the threshold value B is a value for selecting signals with sufficient signal power.

The effective path timing detector 222, comparing the average signal powers at the L timings with the threshold values A and B, detects the timings at which the average signal powers exceed the greater one of the threshold values A and B. The initial weighting factor setting section 224 sets at one the initial values of the weighting factors at the timings detected by the effective path timing detector 222, and the initial values of the weighting factors at the remaining timings at zero. The path selection timing detector 146, comparing the average signal powers at the L timings fed from the measuring sections 134 with the threshold values A and B, detects the timings at which the average signal powers exceed the greater one of the threshold values A and B.

The weighting factor multiplication and demodulation sections 210 multiply the despread outputs of the matched filter 131, which are selected at the timings detected by the detector 146, by the weighting factors corresponding to the outputs of the weighting factor controller 205. The outputs of the matched filter 131 which are thus weighted and selected by the weighting factor multiplication and demodulation sections 210 are RAKE combined by the adder 118. The data decision section 203 generates the data decision signal from the RAKE combined signal. The error signal generating section 204 obtains the difference between the RAKE combined signal and the data decision signal, and generates the error signal (MSE). The weighting factor controller 205 starts, using the error signal and the despread signals fed from the weighting factor multiplication and demodulation section 210 at the timings detected by the path selection timing detector 146, the MMSE control of the values determined by the initial weighting factor setting section 224, and determines the weighting factors for the L timings.

Thus, embodiment 5 measures the average signal powers of the despread signals at all the timings, and sets the threshold values from the measured results. This makes it possible to further reduce the effect of the noise or interference. In addition, the convergence time of the MMSE can be reduced because the MMSE control can determine the initial values of the weighting factors.

Determination of the Threshold Values in Embodiments 3 and 5

An example will now be described of the threshold determination and combined path candidate selection based on the threshold decision in embodiments 3 and 5.

First, the minimum signal power $S_{min}$ (n, m) is detected from the outputs $S^{(1)}$ (n, m) of the individual average signal power measuring sections 134 at the L timings of the mth symbol in the nth slot, where l is $1 \leq l \leq L$, and m is $1 \leq m \leq N_p + N_s$. Then, the threshold value A is determined for the $S_{min}$ (n, m) by the following equation, where $G_A$ is the threshold decision gain ($G_A \geq 1$).

$$A = S_{min}(n,m) \times G_A \qquad (1)$$

Next, the received powers $S^{(1)}$ at the lth timings are compared with the threshold value A to detect X timings-that satisfy $S^{(1)}$ (n, m)$\geq$A, and to make them the candidates of the RAKE combining. The remaining L–X signals, which are considered as consisting of only the thermal noise components or interference components, are excluded from the candidates.

Update of Weighting Factors

An example of the update of the weighting factors, which is carried out by the weighting factor controller 205 in the embodiment 1 (see, FIG. 1) and embodiment 5 (see, FIG. 5) in accordance with the present invention, will now be described with reference to FIG. 6. Here, it is assumed that X=0, and that the weighting factors for the signals at all the L timings output from the matched filter 131 are updated at every symbol period.

Figure 6:
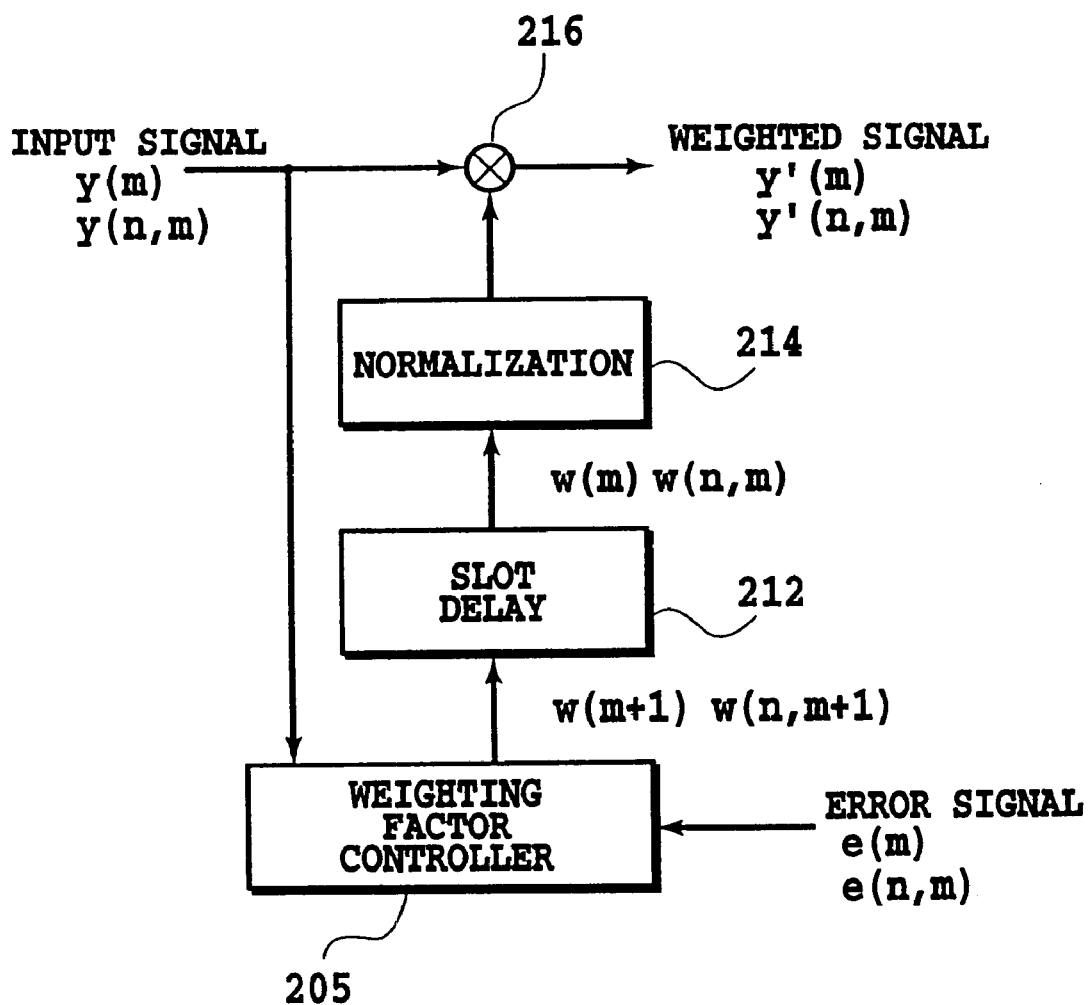
FIG. 6 is a block diagram showing an example of weighting factor control in accordance with the present invention.

As shown in FIG. 6, a weighting factor w(n,m+1) of the (m+1)th symbol in the nth slot is updated using a weighting factor w(n,m), an input signal y(n,m) (complex variable), and an error signal e(n,m) (complex variable). The variables w(n,m) and y(n,m) are a vector consisting of L elements each, and expressed as follows:

$$w(n,m)=\{w^{(1)}(n,m), w^{(2)}(n,m), \ldots, w^{(L)}(n,m)\}^T,$$

$$y(n,m)=\{y^{(1)}(n,m), y^{(2)}(n,m), \ldots, y^{(L)}(n,m)\}^T$$

where T denotes transpose, $y^{(1)}(n,m)$ ($1 \leq l \leq L$) is $y^{(1)}(n,m)=r^{(1)}(n,m)$ in the configuration of the embodiment 1 (FIG. 1), and $y^{(1)}(n,m)=r^{(1)}(n,m)\xi^{(1)*}(n,m)$ in the configuration of embodiment 2 (FIG. 2), where $r^{(1)}(n,m)$ denotes the outputs of the matched filter, $\xi^{(1)*}(n,m)$ denotes the channel estimates, and * denotes a complex conjugate. The error signal e(n,m) is the difference between the RAKE combined signal $\hat{d}(n, m)$ and the data decision signal $d_{ref}(n,m)$, and expressed as follows.

$$e(n,m)=d_{ref}(n,m)-\hat{d}(n,m)$$

in which, as the data decision signal $d_{ref}(n,m)$, the pilot symbol replicas are used for the pilot symbols, and signal points after the hard decision (binary decision) is adopted for the data symbols. Update equation is expressed as follows when $w^{(1)}(n,m)$ is a complex variable, for example.

$$w(n,m+1)=w(n,m)+y(n,m)e^*(n,m) \quad (2)$$

On the other hand, when $w^{(1)}(n,m)$ is a scalar variable, it is expressed by the following two expressions.

$$w(n,m+1)=w(n,m)+Re\{y(n,m)e^*(n,m)\} \quad (3)$$

$$w(n,m+1)=w(n,m)+|y(n,m)|^2|e(n,m)|^2 \quad (4)$$

where Re{.} denotes a real part. Representing the weighted signal by y'(m), it is expressed as follows when $w^{(1)}(m)$ is a complex variable.

$$y'(n,m)=y(n,m)w^*(n,m) (w^{(1)}(n,m) \text{ is a complex variable}) \quad (5)$$

When $w^{(1)}(n,m)$ are a scalar variable, they are multiplied by weighting factors normalized by the maximum value of the L weighting factors to prevent the divergence of the weighting factors. Thus, y'(n,m) has the following three expressions.

$$y'(n, m) = y(n, m) \frac{w(n, m)}{\max_l \{w(n, m)\}} \quad (6)$$

$$y'(n, m) = y(n, m) \frac{\sqrt{w(n, m)}}{\sqrt{\max_l \{w(n, m)\}}} \quad (7)$$

$$y'(n, m) = y(n, m) \frac{\log_{10}(w(n, m))}{\log_{10}(\max_l \{w(n, m)\})} \quad (8)$$

Determination of the Threshold Values in Embodiments 4 and 5

Examples will now be described of the threshold determination and the initial weighting factor setting based on the threshold values in embodiments 4 and 5 in accordance with the present invention.

First, the minimum signal power $S_{min}$ (n, m) and the maximum signal power $S_{max}$ (n, m) are detected from the outputs $S^{(1)}$ (n, m) of the individual average signal power measuring sections 134 at the L timings of the mth symbol in the nth slot, where l is $1 \leq l \leq L$. Then, the threshold values A and B are determined for the $S_{min}$ (n, m) and $S_{max}$ (n, m) by the following equations, where $G_A$ ($G_A \geq 1$) and $G_B$ ($G_B \leq 1$) are a threshold decision gain each.

$$A = S_{min}(n, m) \times G_A \quad (9)$$

$$B = S_{max}(n, m) \times G_B \quad (10)$$

Next, the received powers at the lth timings are compared with the threshold values A and B to detect timings that satisfy $S^{(1)}$ (n, m)$\leq$A, thus to detect timings of only the thermal noise or interference components. Subsequently, timings at which the received powers are sufficient are detected by detecting timings at which $S^{(1)}$ (n, m)$\geq$B. Thus, Y timings which satisfy $S^{(1)}$ (n, m)$\geq$A and $S^{(1)}$ (n, m)$\geq$B are detected as the candidates of the multipaths. The initial values of the weighting factors at these timings are set at one, and the weighting factors at the remaining L–Y timings are set at zero.

Control of Weighting Factors

An example of the weighting factor control applied to the present invention will now be described. First, a timing providing a greatest weighting factor is selected as the timing of one of the effective multipaths. With placing the weighting factors at ±k timings around the detected timing at zero, a timing providing the next greatest weighting factor is detected. In this way, the weighting factors are sequentially determined. For example, the weighting factors associated with timings in (uq–k)$\leq$l$\leq$(uq+K), where uq is the timing providing the qth multipath, are all placed at zero. Placing the timings before and after the selected multipaths at zero is to prevent the same multipaths from being weighted and combined by the over sampling. The number k is set at k=s/2, for example, where s is the number of over sampling.

By thus iterating the determination of the weighting factor for each of the multipaths, all the multipaths are weighted to be RAKE combined.

Determination of Weighting Factors

An example of determining the weighting factors will now be described with reference to FIG. 7, in which no restriction is given to the weighting factor control, unlike the control in embodiments 1 and 2.

Figure 7:
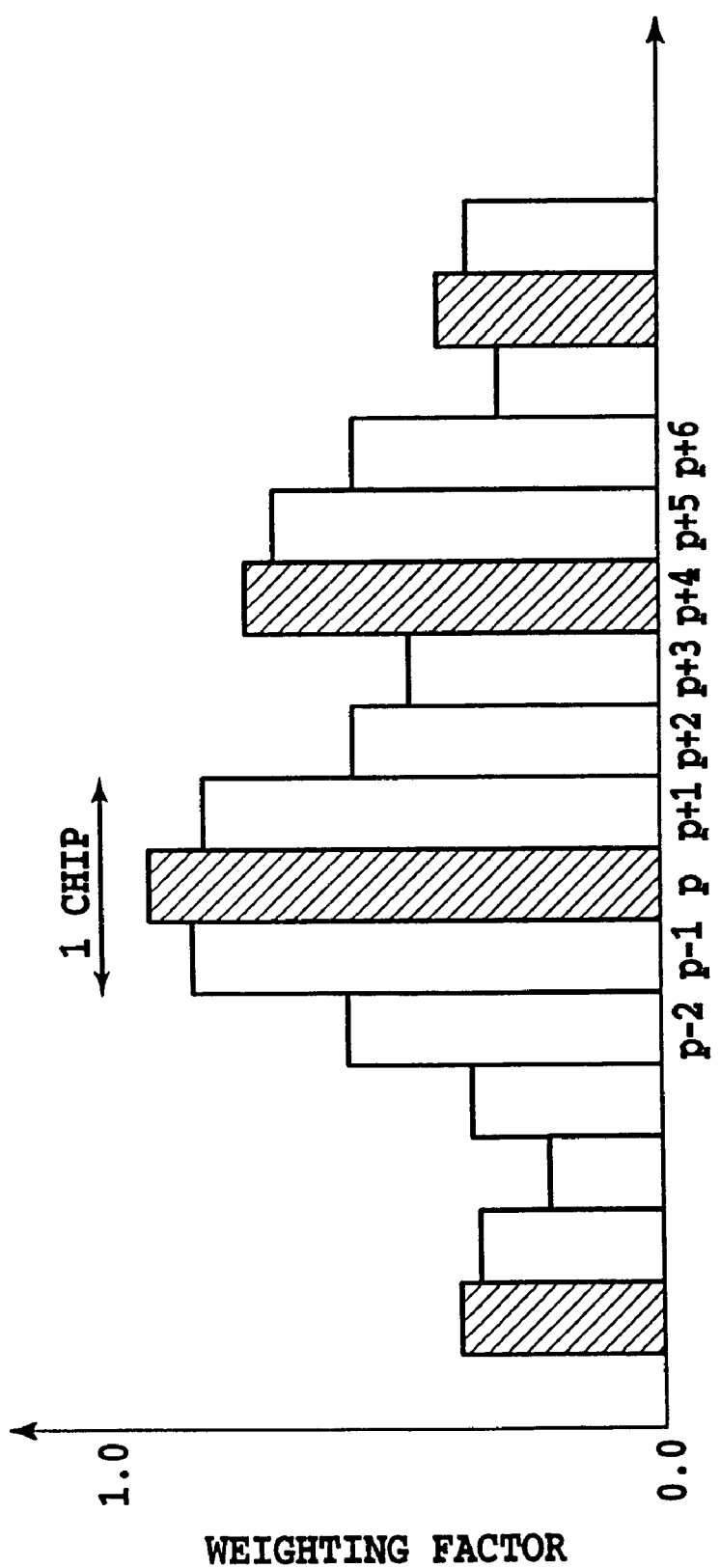
FIG. 7 is a block diagram showing another example of the weighting factor control in accordance with the present invention.

Assume that the weighting factors at the L timings have been calculated as illustrated in the graph of FIG. 7, and that the number s of the over sampling is s=4, and the number k of the timings at which the weighting factors are placed at zero for the individual multipaths whose weighting factors have already been determined.

Assume that the point p in FIG. 7 is detected as the timing of one of the multipaths. In this case, although the timing that provides the next great weighting factor is p–1, the weighting factors of the four points p–2, p–1, p+1 and p+2 included in the range of ±k with respect to the point p are all placed at zero. Thus, the point p+4 is selected as the next multipath timing, so that the weighting factors at the points p+3, p+5 and p+6 are set at zero. In, this way, the weighting factors are set zero at the timings before and after the detected multipaths so that they are not RAKE combined.

Configuration of a Receiver Employing Embodiment 1

Figure 8A:
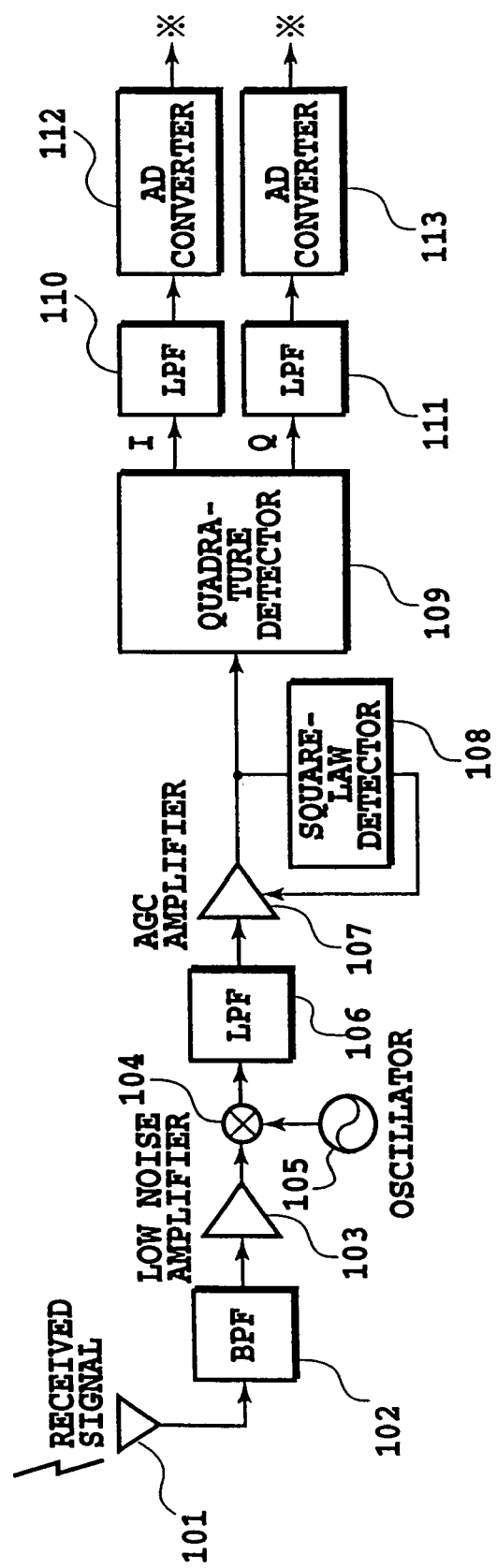
FIGS. 8A and 8B are block diagrams showing a configuration of a DS-CDMA receiver employing the embodiment 1 in accordance with the present invention.
Figure 8B:
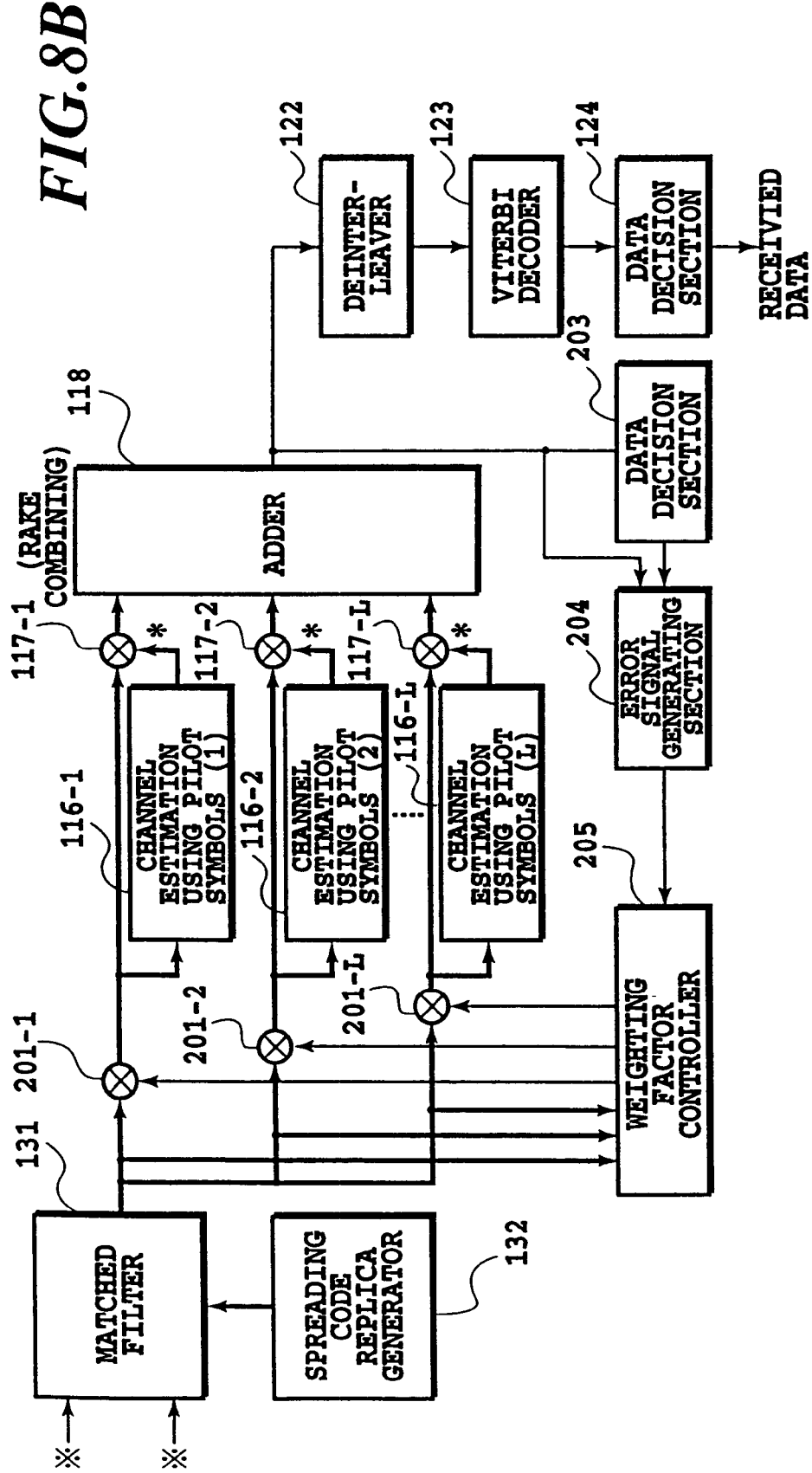

FIGS. 8A and 8B show a configuration of an embodiment of a receiver using embodiment 1 (see, FIG. 1) in accordance with the present invention.

In FIGS. 8A and 8B, a spread modulation signal received by an antenna 101 is amplified by a low noise amplifier 103 after passing through a bandpath filter 102, and then undergoes frequency conversion into an IF signal by circuits 104–106. The IF signal undergoes linear amplification that compensates for its amplitude fluctuations due to fading through an AGC amplifier 107 and a square-law detector 108, followed by the quadrature detection by a quadrature detector 109. The baseband signals output from the quadrature detector 109 are converted into digital signals by A/D converters 112 and 113. The digital signals are despread by a matched filter 131 having pg taps. Thus, despread signals are output at L (pg×s) timings, where s is the number of over samplings per chip. The despread signals at the L timings are multiplied by multipliers 201 by the weighting factors at the corresponding timings output from a weighting factor controller 205, respectively. The weighted outputs of the matched filter 131 at the L timings are demodulated by circuits 116 and 117, and RAKE combined by an adder 118. The RAKE combined signal is deinterleaved by a deinterleaver 122, followed by decoding by a Viterbi decoder 123. A data restoring section or a data decision section 124 makes a hard decision of the decoded signal fed from the Viterbi decoder 123, thereby restoring the received data. A data decision section 203 generates a data decision signal from the RAKE combined signal, and an error signal generating section 204 generates an error signal (MSE) by calculating the difference between the RAKE combined signal and the data decision signal.

A weighting factor controller 205 determines the weighting factors at the L timings by carrying out such control that minimizes the error signal (MMSE) using the error signal and the despread signals at the L timings fed from the matched filter 131. In addition, it detects the timing providing the greatest one of the L weighting factors, places the weighting factors at zero at the ±k timings around the detected timing, where k is a natural number, and determines the weighting factors at all the timings by sequentially detecting the timings providing the next greatest weighting factors. The determined weighting factors constitute the outputs of the weighting factor controller 205.

The RAKE receiver as shown in FIGS. 8A and 8B assigns weights to the signals despread by the matched filter at all the timings through the MMSE control, and then RAKE combines them. This has an advantage of being able to combine only the effective paths even if the number of multipaths varies because of the fluctuations in the delay profile.

Configuration of a Receiver Employing Embodiment 2

Figure 9A:
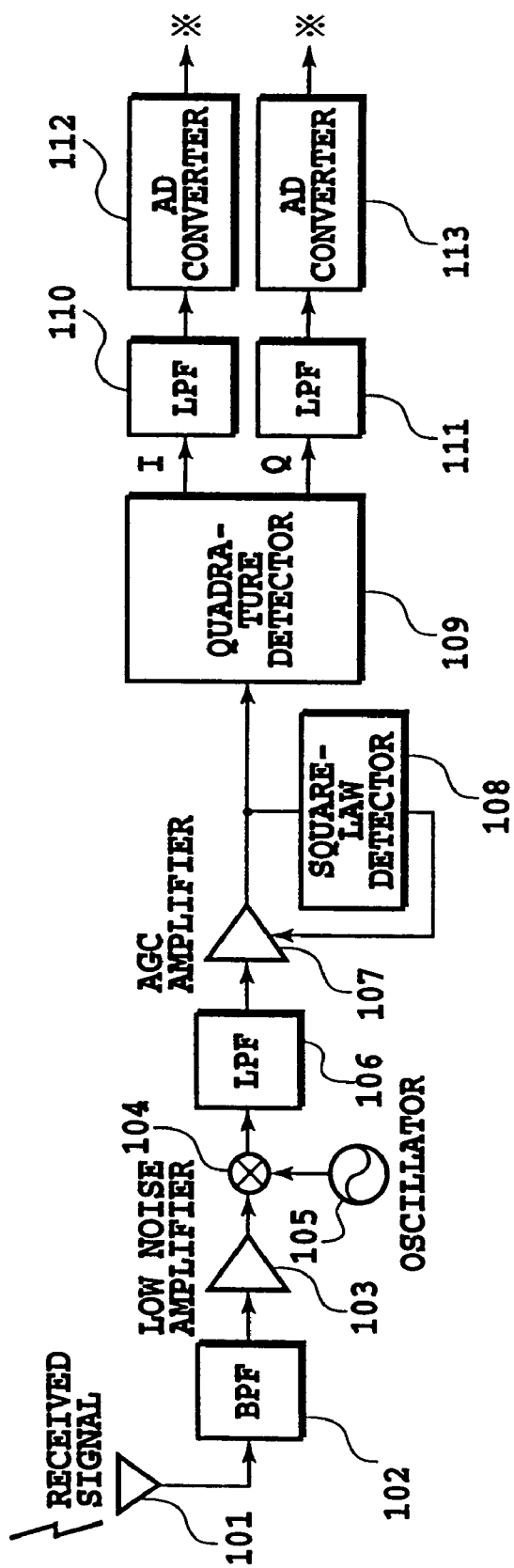
FIGS. 9A and 9B are block diagrams showing a configuration of a DS-CDMA receiver employing the embodiment 2 in accordance with the present invention.
Figure 9B:
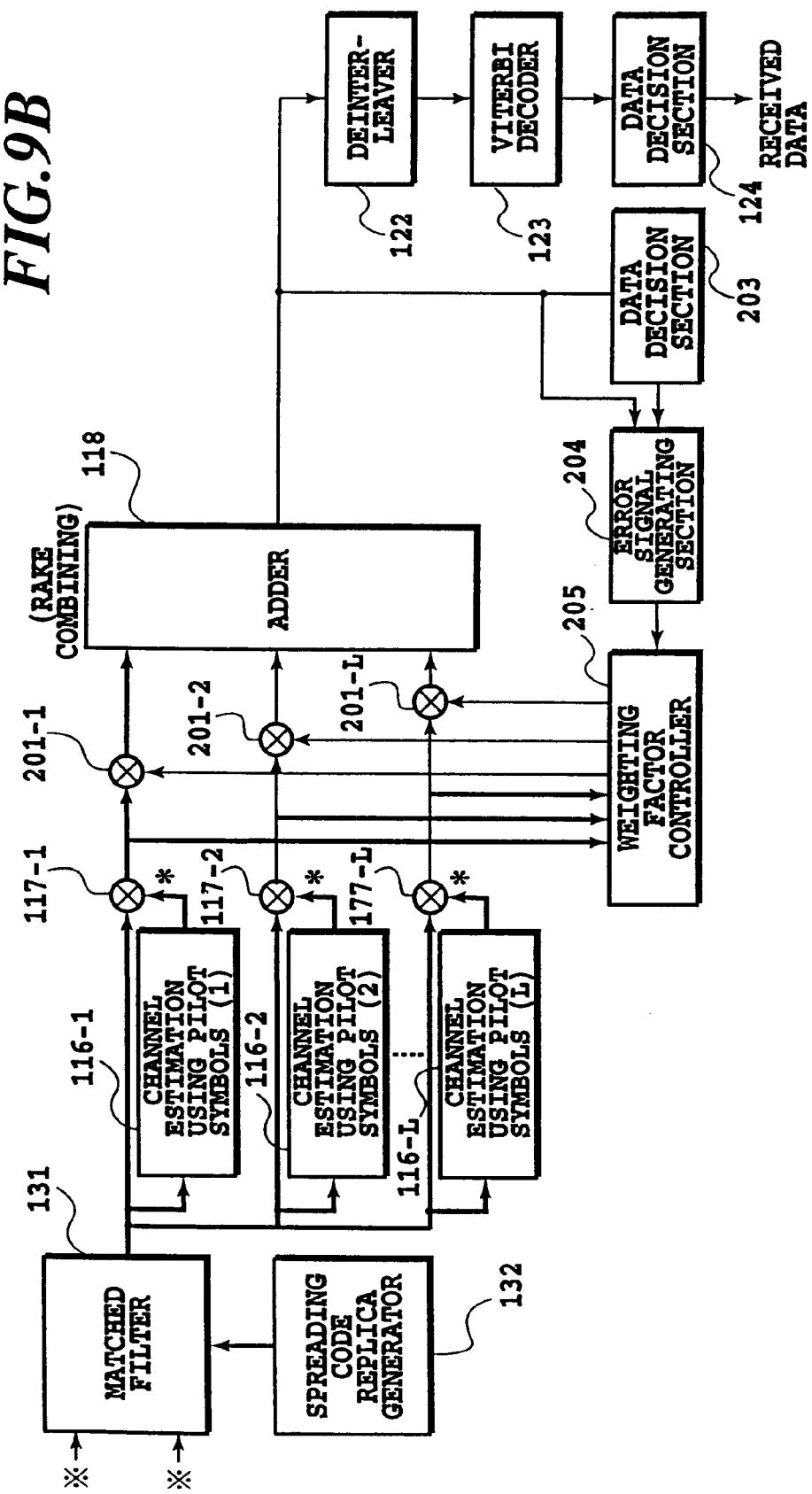

FIGS. 9A and 9B show a configuration of an embodiment of a receiver using embodiment 2 (see, FIG. 2) in accordance with the present invention.

The spread modulation signal received is amplified by the low noise amplifier 103, and then undergoes frequency conversion into the IF signal. The IF signal is compensated for its amplitude fluctuations due to fading through the AGC amplifier 107 and the square-law detector 108, followed by the quadrature detection by the quadrature detector 109. The baseband signals output from the quadrature detector 109 are converted into digital signals by the A/D converters 112 and 113. The digital signals are despread by the matched filter 131 with pg taps. Thus, despread signals are output at L (=pg×s) timings, where s is the number of over samplings per chip. The despread signals at the L timings are subjected to absolute coherent detection demodulation using the pilot symbols through circuits 116 and 117. The demodulation output signals at the L timings are multiplied by the multipliers 201 by the weighting factors at the corresponding timings output from the weighting factor controller 205, respectively. The outputs weighted and demodulated at the L timings are RAKE combined by the adder 118. The RAKE combined signal is deinterleaved by the deinterleaver 122, followed by decoding by the Viterbi decoder 123. Then, the data restoring section or data decision section 124 makes a hard decision of the decoded signal, thereby restoring the received data.

Furthermore, the data decision section 203 generates the data decision signal from the RAKE combined signal, and the error signal generating section 204 generates the error signal (MSE) by calculating the difference between the RAKE combined signal and the data decision signal. The weighting factor controller 205, using the error signal and the despread signals at the L timings fed from the multipliers 117, controls the multipliers 201 in such a manner that minimizes the error signal (MMSE), thereby determining the weighting factors at the L timings. In addition, it detects the timing providing the greatest one of the L weighting factors, places the weighting factors at zero at the 1 k timings around the detected timing, where k is a natural number, and determines the weighting factors at all the timings by sequentially detecting the timings providing the next greatest weighting factors. The determined weighting factors constitute the outputs of the weighting factor controller 205.

The RAKE receiver as shown in FIGS. 9A and 9B assigns weights obtained through the MMSE control to all the signals despread by the matched filter at all the timings, and then RAKE combines them. This has an advantage of being able to combine only the effective paths even if the number of multipaths varies because of the fluctuations in the delay profiles.

Configuration of a Receiver Employing Embodiments 1 and 3

Figure 10A:
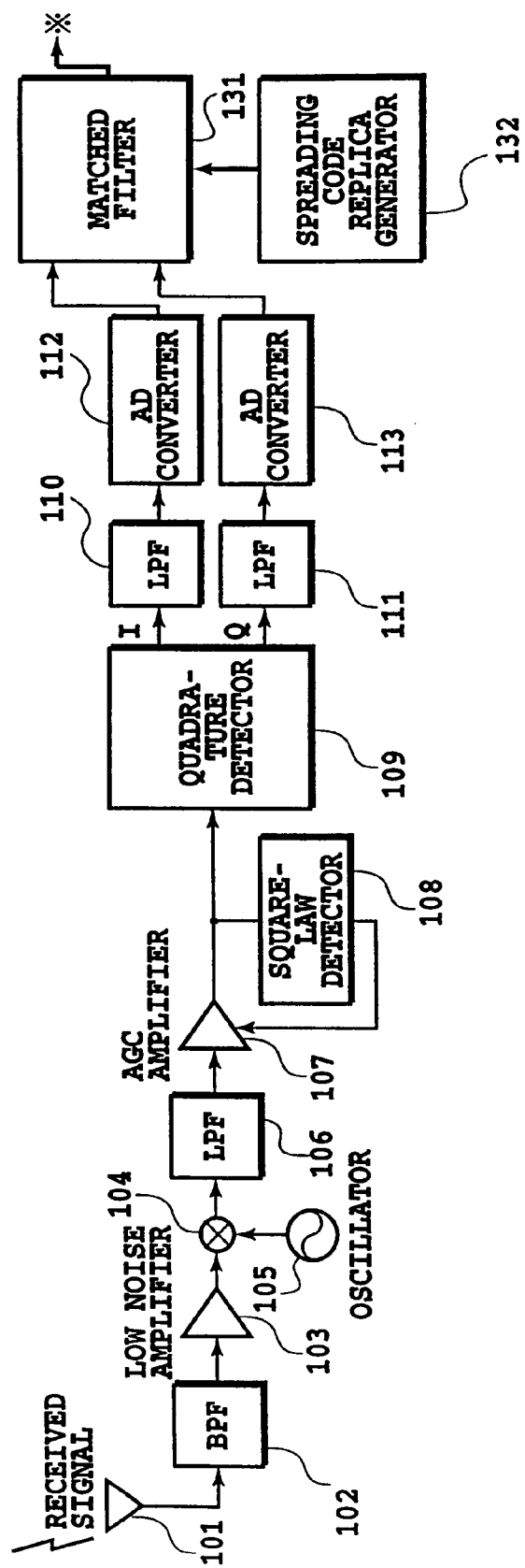
FIGS. 10A and 10B are block diagrams showing a configuration of a DS-CDMA receiver employing the embodiments 1 and 3 in accordance with the present invention.
Figure 10B:
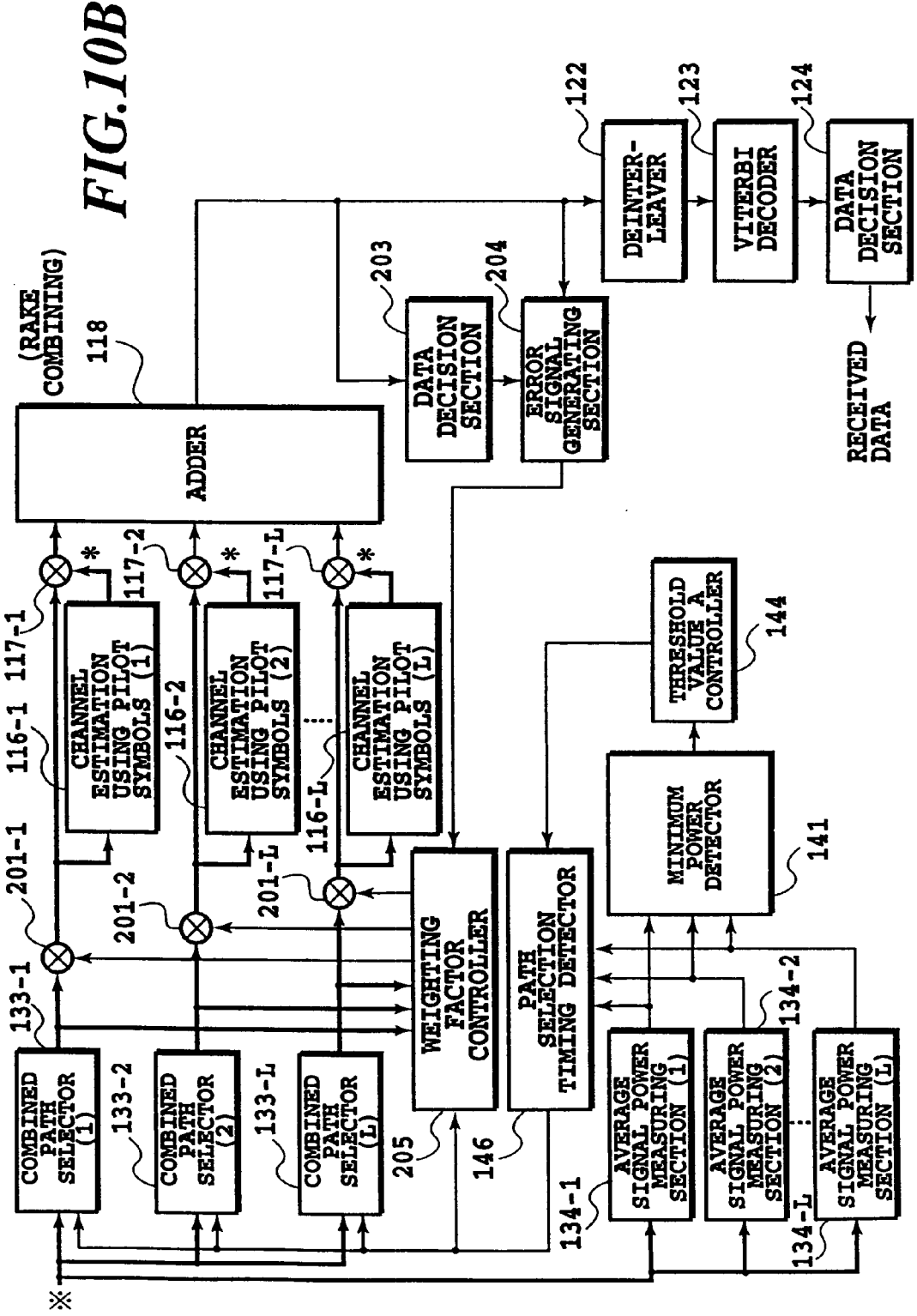

FIGS. 10A and 10B show a configuration of an embodiment of a receiver using embodiments 1 and 3 in accordance with the present invention.

In FIGS. 10A and 10B, the spread modulation signal received is amplified by the low noise amplifier 103, and then undergoes frequency conversion into the IF signal. The IF signal is compensated for its amplitude fluctuations due to fading through the AGC amplifier 107 and square-law detector 108, followed by the quadrature detection by the quadrature detector 109. The baseband signals output from the quadrature detector 109 are converted into digital signals by the A/D converters 112 and 113. The digital signals are despread by the matched filter 131 with pg taps. Thus, despread signals are output at L (pg×s) timings, where s is the number of over samplings per chip.

The outputs of the matched filter 131 are supplied to average signal power measuring sections 134 to measure respective average signal powers at the L timings. The minimum power detector 141 detects the minimum signal power from the measured results of the average signal powers at the L timings. The threshold value A controller 144 obtains the threshold value A using the minimum signal power detected. Here, the threshold value A is a value for preventing the signals consisting of only noise or interference components from being combined.

The path selection timing detector 146 compares the average signal powers at L timings with the threshold value A, and detects X timings providing the average signal powers equal to or greater than the threshold value A. The combined path selectors 133 select the outputs of the matched filter 131 at the X timings detected. The selected X outputs of the matched filter 131 are multiplied by the multipliers 201 by the weighting factors at the corresponding timings output from the weighting factor controller 205, respectively. Those outputs of the matched filter 131, which are selected by the selectors 133 and multiplied by the weighting factors by the multipliers 201, are subjected to the absolute coherent detection demodulation by the channel estimators 116 using the pilot symbols. The outputs from the multipliers 117 are RAKE combined by the adder 118. The RAKE combined signal is deinterleaved by the deinterleaver 122, followed by decoding by the Viterbi decoder 123. Then, the data restoring section or data decision section 124 makes a hard decision of the decoded signal, thereby restoring the received data. The data decision section 203 generates the data decision signal from the RAKE combined signal.

The error signal generating section 204 generates the error signal (MSE) by calculating the difference between the RAKE combined signal and the data decision signal. Carrying out the MMSE control of the multipliers 201 in such a manner that minimizes the error signal (MMSE) using the error signal and the despread signals at the X timings detected by the path selection timing detector 146, the weighting factor controller 205 determines the weighting factors at the timings detected. In addition, it detects the timing providing the greatest one of the X weighting factors, places the weighting factors at zero at the ±k timings around the detected timing, where k is a natural number, and determines the weighting factors at all the timings by sequentially detecting the timings providing the next greatest weighting factors. The determined weighting factors constitute the outputs of the weighting factor controller 205.

The RAKE receiver as shown in FIGS. 10A and 10B assigns weights obtained through the MMSE control to the signals despread by the matched filter, and then RAKE combines them. This has an advantage of being able to combine only the effective paths even if the number of multipaths varies because of the fluctuations in the delay profiles.

In addition, it can further reduce the effect of the noise or interference by measuring the average received powers of the despread signals at all the timings, by setting the threshold value from the measured result, and by combining the signals above the threshold value.

Configuration of a Receiver Employing Embodiments 2 and 3

Figure 11A:
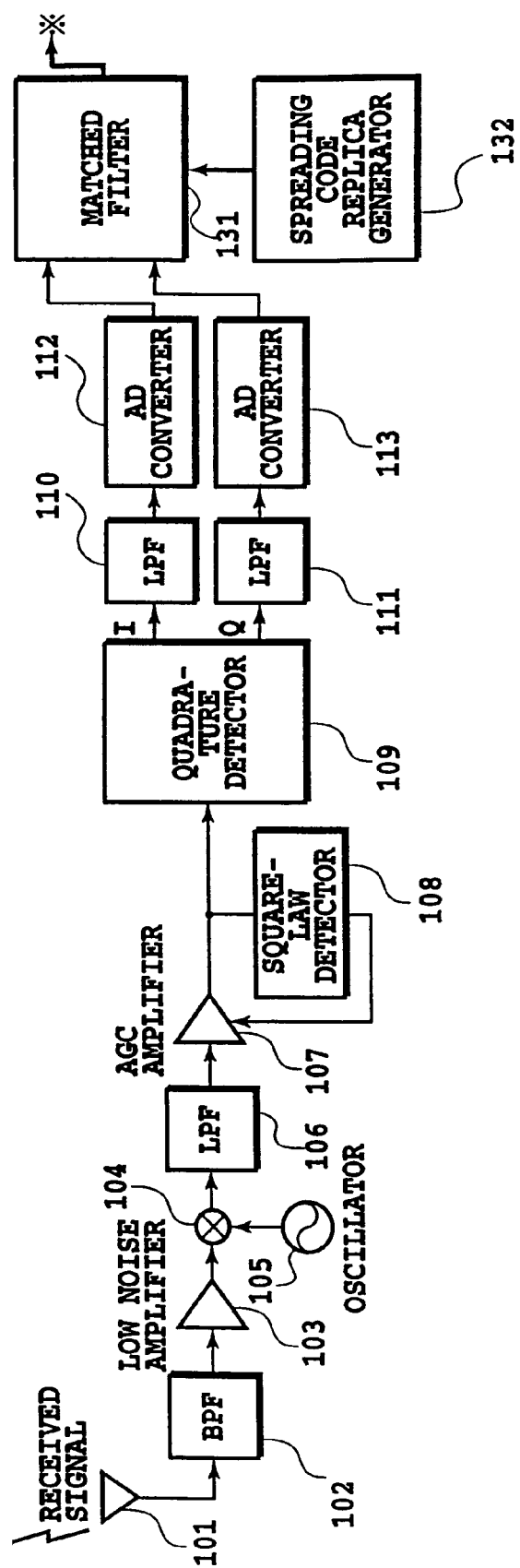

FIGS. 11A and 11B show a configuration of an embodiment of a receiver using embodiments 2 and 3 in accordance with the present invention.

The spread modulation signal received is amplified by the low noise amplifier 103, and then undergoes frequency conversion into the IF signal. The IF signal is compensated for its amplitude fluctuations due to fading through the AGC amplifier 107 and square-law detector 108, followed by the quadrature detection by the quadrature detector 109. The baseband signals output from the quadrature detector 109 are converted into digital signals by the A/D converters 112 and 113. The digital signals are despread by the matched filter 131 with pg taps. Thus, despread signals are output at L (pg×s) timings, where s is the number of over samplings per chip.

The outputs of the matched filter 131 are supplied to average signal power measuring sections 134 to measure respective average signal powers at the L timings. The minimum power detector 141 detects the minimum signal power from the measured results of the average signal powers at the L timings. The threshold value A controller 144 obtains the threshold value A using the minimum signal power detected. Here, the threshold value A is a value for preventing the signals consisting of only noise or interference components from being combined.

The path selection timing detector 146 compares the average signal powers at the L timings with the threshold value A, and detects X timings providing the average signal powers equal to or greater than the threshold value A. The combined path selectors 133 select the outputs of the matched filter 131 at the X timings detected. The channel estimators 116 carry out the absolute coherent detection demodulation of the selected X outputs of the matched filter 131 by using the pilot symbols. The demodulated outputs from the multipliers 117 are supplied to the multipliers 201 so that they are multiplied by the weighting factors at the corresponding timings output from the weighting factor controller 205.

In this way, the output signals obtained by performing the selection, demodulation and weighting on the outputs of the matched filter 131 are RAKE combined by the adder 118. The RAKE combined signal is deinterleaved by the deinterleaver 122, followed by decoding by the Viterbi decoder 123, and then supplied to the data decision section 124 that restores the received data. The data decision section 203 generates the data decision signal from the RAKE combined signal. The error signal generating section 204 generates the error signal (MSE) by calculating the difference between the RAKE combined signal and the data decision signal.

The weighting factor controller 205, carrying out the MMSE control using the error signal and the despread signals fed from the multipliers 117 at the X timings detected by the path selection timing detector 146, determines the weighting factors at the timings detected. In addition, it detects the timing providing the greatest one of the X weighting factors, places the weighting factors at zero at the ±k timings around the detected timing, where k is a natural number, and determines the weighting factors at the entire timings by sequentially detecting the timings providing the next greatest weighting factors. The determined weighting factors constitute the outputs of the weighting factor controller 205.

The RAKE receiver as shown in FIGS. 11A and 11B assigns weights obtained through the MMSE control to the signals despread by the matched filter, and then RAKE combines them as in the RAKE receiver shown in FIGS. 10A and 10B. This has an advantage of being able to combine only the effective paths even if the number of multipaths varies because of the fluctuations in the delay profile. Furthermore, it can reduce the effect of the noise or interference by measuring the average received powers of the despread signals at all the timings, by setting the threshold value from the measured result, and by RAKE combining the signals above the threshold value.

Configuration of a Receiver Employing Embodiments 1 and 4

Figure 12A:
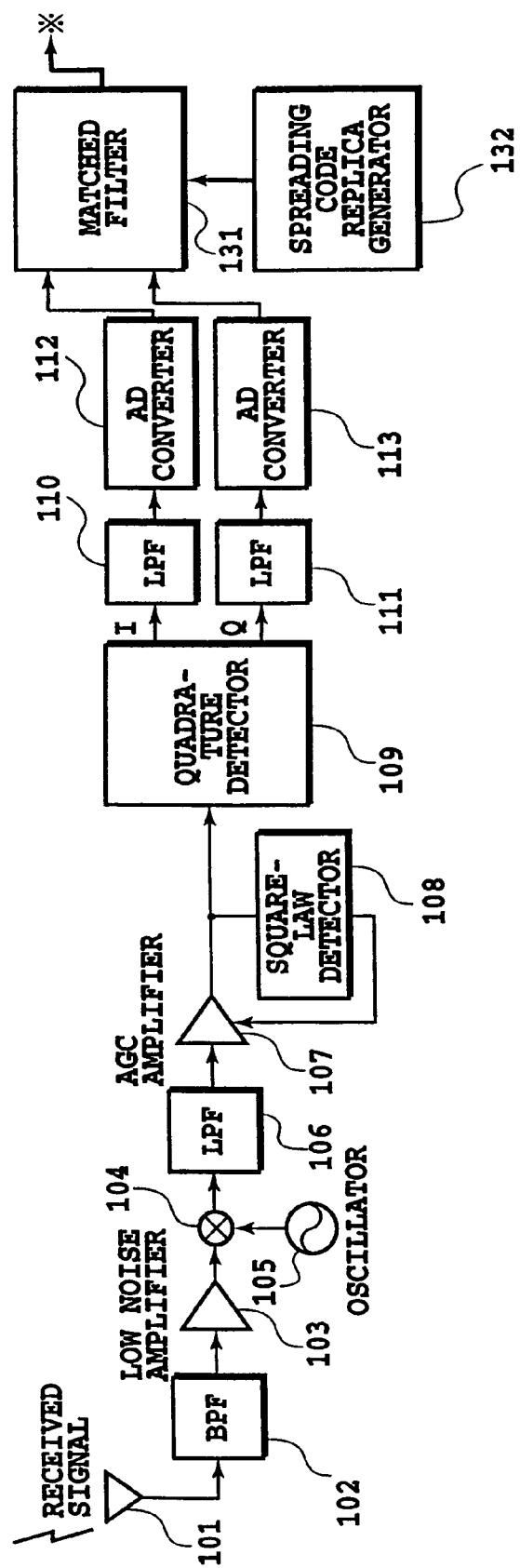
FIGS. 12A and 12B are block diagrams showing a configuration of a DS-CDMA receiver employing the embodiments 1 and 4 in accordance with the present invention.
Figure 12B:
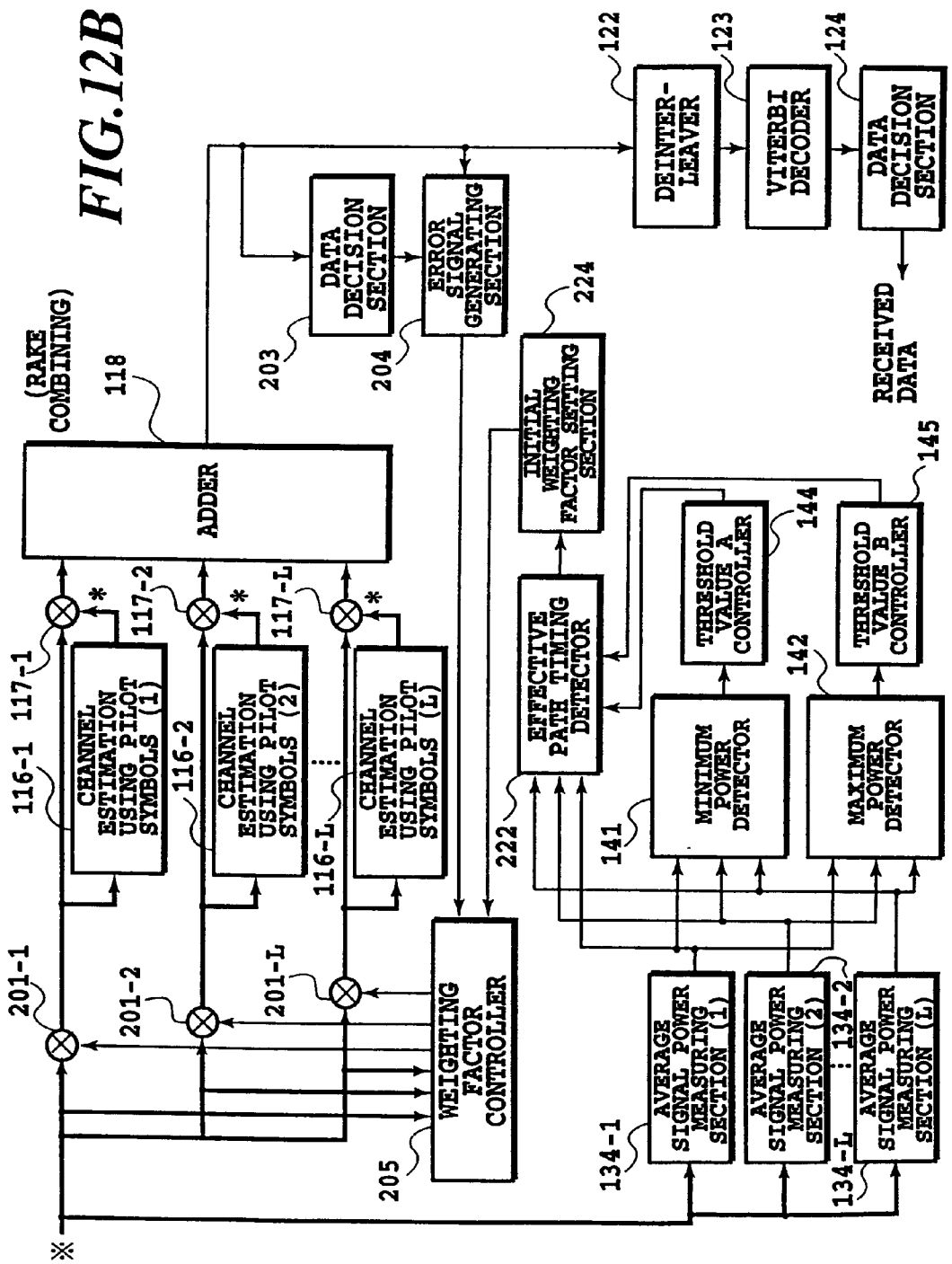

FIGS. 12A and 12B show a configuration of an embodiment of a receiver using embodiments 1 and 4 in accordance with the present invention.

In FIGS. 12A and 12B, the spread modulation signal received is amplified by the low noise amplifier 103, and then undergoes frequency conversion into the IF signal. The IF signal is compensated for its amplitude fluctuations due to fading through the AGC amplifier 107 and square-law detector 108, followed by the quadrature detection by the quadrature detector 109. The baseband signals output from the quadrature detector 109 are converted into digital signals by the A/D converters 112 and 113. The digital signals are despread by the matched filter 131 with pg taps. Thus, despread signals are output at L (pg×s) timings, where s is the number of over samplings per chip. The outputs of the matched filter 131 at the L timings are multiplied by the weighting factors at the corresponding timings output from the weighting factor controller 205 by the multipliers 201, respectively. The demodulators 116 and 117 carry out using the pilot symbols the absolute coherent detection demodulation of the outputs of the matched filter 131 which are multiplied by the weighting factors. The demodulated outputs are RAKE combined by the adder 118. The RAKE combined signal is deinterleaved by the deinterleaver 122, followed by decoding by the Viterbi decoder 123, and then supplied to the data decision section 124 that restores the received data.

The data decision section 203 generates the data decision signal from the RAKE combined signal. The error signal generating section 204 generates the error signal (MSE) by calculating the difference between the RAKE combined signal and the data decision signal. The weighting factor controller 205, carrying out the MMSE control using the error signal and the despread signals fed from the matched filter 131 at the L timings, determines the weighting factors at the timings detected. In addition, it detects the timing providing the greatest one of the L weighting factors, places the weighting factors at zero at the ±k timings around the detected timing, where k is a natural number, and determines the weighting factors at the entire timings by sequentially detecting the timings providing the next greatest weighting factors, thereby determining the weighing factors at all the timings. The determined weighting factors constitute the outputs of the weighting factor controller 205.

The initial values of the weighting factors at the start of the MMSE control are determined as follows. First, the outputs of the matched filter 131 are supplied to average signal power measuring sections 134 to measure respective average signal powers at the L timings. The minimum power detector 141 and maximum power detector 142 detect the minimum signal power and maximum signal power at the L timings, respectively. The threshold value A controller 144 obtains the threshold value A using the minimum signal power detected. The threshold value B controller 145 obtains the threshold value B using the maximum signal power detected. Here, the threshold value A is a value for preventing the signals consisting of only noise or interference components from being combined, and the threshold value B is a value for selecting signals with sufficient signal power. An effective path timing detector 222 compares the average signal powers at the L timings with the threshold values A and B, and detects Y timings providing the average signal powers equal to or greater than the greater one of the threshold values A and B. An initial weighting factor setting section 224 sets the initial values of the weighting factors at the Y timings detected by the effective path timing detector 222 at one, and the initial values of the weighting factors at the remaining L–Y timings at zero.

The RAKE receiver as shown in FIGS. 12A and 12B assigns weights obtained through the MMSE control to the signals despread by the matched filter at all the timings, and then RAKE combines them. This has an advantage of being able to combine only the effective paths even if the number of multipaths varies because of the fluctuations in the delay profiles.

Furthermore, it can reduce the convergence time of the MMSE because the initial values of the weighting factors at the MMSE are determined in advance.

Configuration of a Receiver Employing Embodiments 2 and 4

Figure 13A:
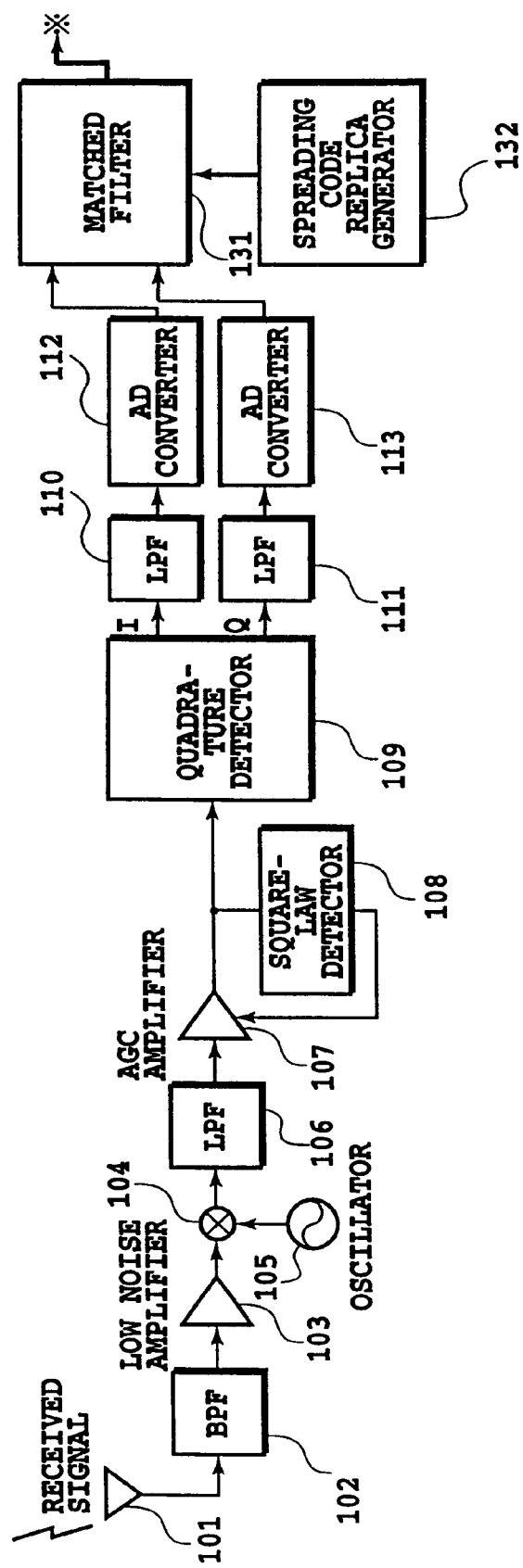
FIGS. 13A and 13B are block diagrams showing a configuration of a DS-CDMA receiver employing the embodiments 2 and 4 in accordance with the present invention.
Figure 13B:
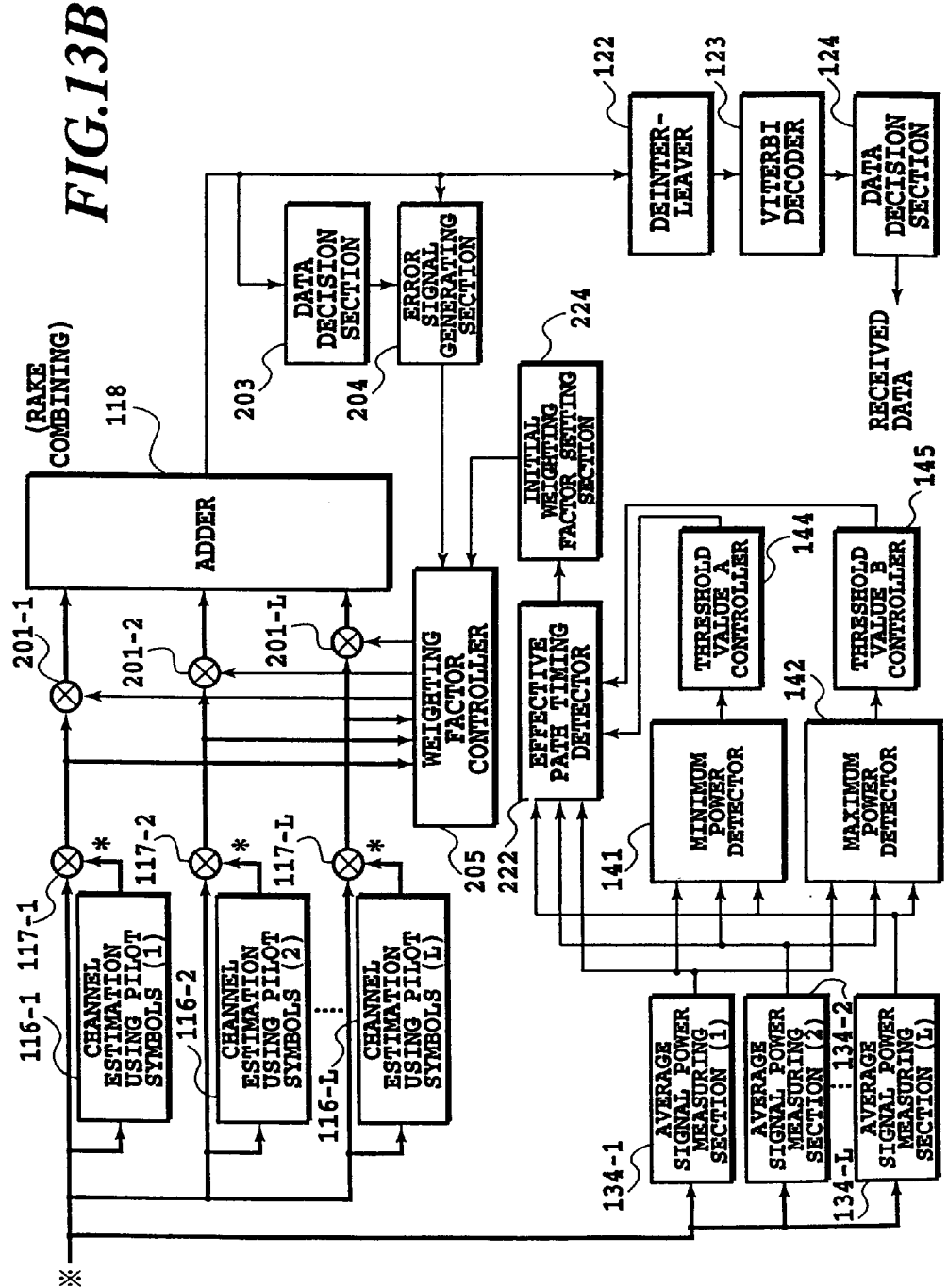

FIGS. 13A and 13B show a configuration of an embodiment of a receiver using embodiments 2 and 4 in accordance with the present invention.

In FIGS. 13A and 13B, the spread modulation signal received is amplified by the low noise amplifier 103, and then undergoes frequency conversion into the IF signal. The IF signal is compensated for its amplitude fluctuations due to fading through the AGC amplifier 107 and the square-law detector 108, followed by the quadrature detection by the quadrature detector 109. The baseband signals output from the quadrature detector 109 are converted into digital signals by the A/D converters 112 and 113. The digital signals are despread by the matched filter 131 with pg taps. Thus, despread signals are output at L (pg×s) timings, where s is the number of over samplings per chip. The demodulators 116 and 117 carry out using the pilot symbols the absolute coherent detection demodulation of the outputs of the matched filter 131 at the L timings. The demodulated outputs are multiplied by the multipliers 201 by the weighting factors at the corresponding timings output from the weighting factor controller 205, respectively. The outputs of the multipliers 201 are RAKE combined by the adder 118. The RAKE combined signal is deinterleaved by the deinterleaver 122, followed by decoding by the Viterbi decoder 123, and then supplied to the data decision section 124 that restores the received data. The data decision section 203 generates the data decision signal from the RAKE combined signal. The error signal generating section 204 generates the error signal (MSE) by calculating the difference between the RAKE combined signal and the data decision signal. The weighting factor controller 205, carrying out the MMSE control using the error signal and the despread signals at the L timings fed from the demodulators 116 and 117, determines the weighting factors at the timings detected.

In addition, it detects the timing providing the greatest one of the L weighting factors, places the weighting factors at zero at the ±k timings around the detected timing, where k is a natural number, and determines the weighting factors at the entire timings by sequentially detecting the timings providing the next greatest weighting factors.

The weighting factors thus determined constitute the outputs of the weighting factor controller 205. The initial values of the weighting factors at the start of the MMSE control are determined as follows. First, the outputs of the matched filter 131 are supplied to average signal power measuring sections 134 to measure respective average signal powers at the L timings. The minimum power detector 141 and maximum power detector 142 detect the minimum signal power and maximum signal power at the L timings, respectively. The threshold value A controller 144 obtains the threshold value A using the minimum signal power detected. The threshold value B controller 145 obtains the threshold value B using the maximum signal power detected. Here, the threshold value A is a value for preventing the signals consisting of only noise or interference components from being combined, and the threshold value B is a value for selecting signals with sufficient signal power. The effective path timing detector 222 compares the average signal powers at the L timings with the threshold values A and B. and detects Y timings providing the average signal powers equal to or greater than the greater one of the threshold values A and B.

The initial weighting factor setting section 224 sets at one the initial values of the weighting factors at the Y timings detected by the effective path timing detector 222, and the initial values of the weighting factors at the remaining L–Y timings at zero.

The RAKE receiver as shown in FIGS. 13A and 13B assigns the weights obtained through the MMSE control to the signals despread by the matched filter at all the timings as the RAKE receiver as shown in FIGS. 12A and 12B does, and then RAKE combines them. This has an advantage of being able to combine only the effective paths even if the number of multipaths varies because of the fluctuations in the delay profiles.

Furthermore, it can reduce the convergence time of the MMSE because the initial values of the weighting factors at the MMSE control are determined in advance.

Configuration of a Receiver Employing Embodiments 1 and 5

Figure 14A:
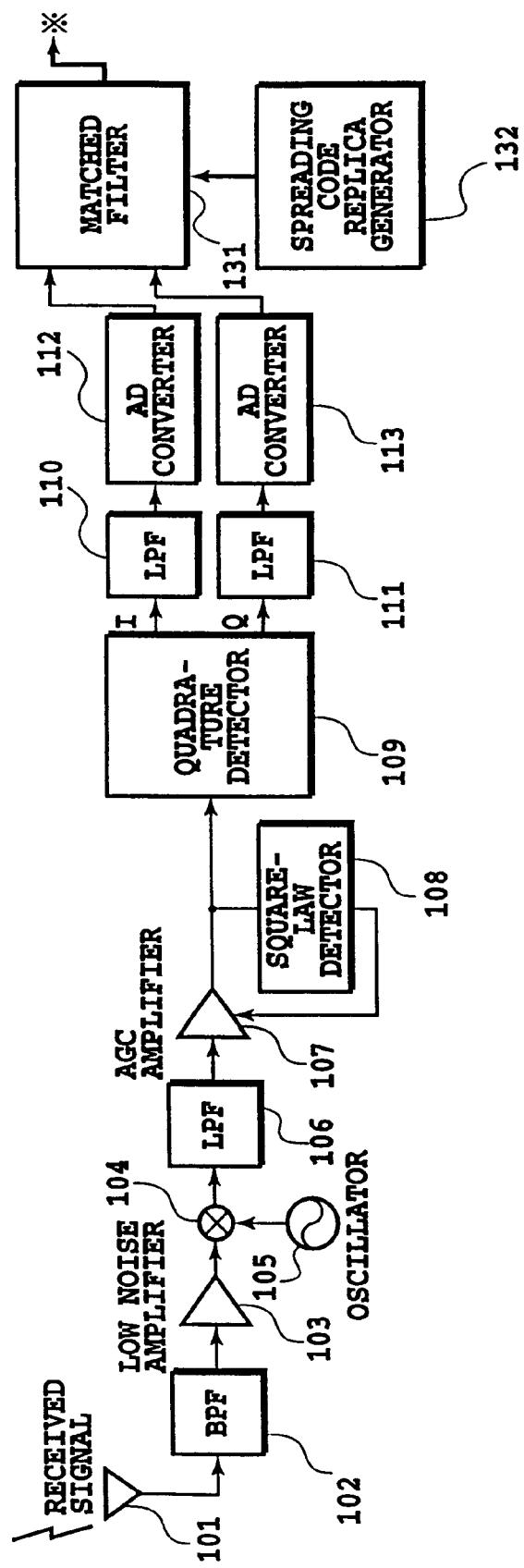
FIGS. 14A and 14B are block diagrams showing a configuration of a DS-CDMA receiver employing the embodiments 1 and 5 in accordance with the present invention.
Figure 14B:
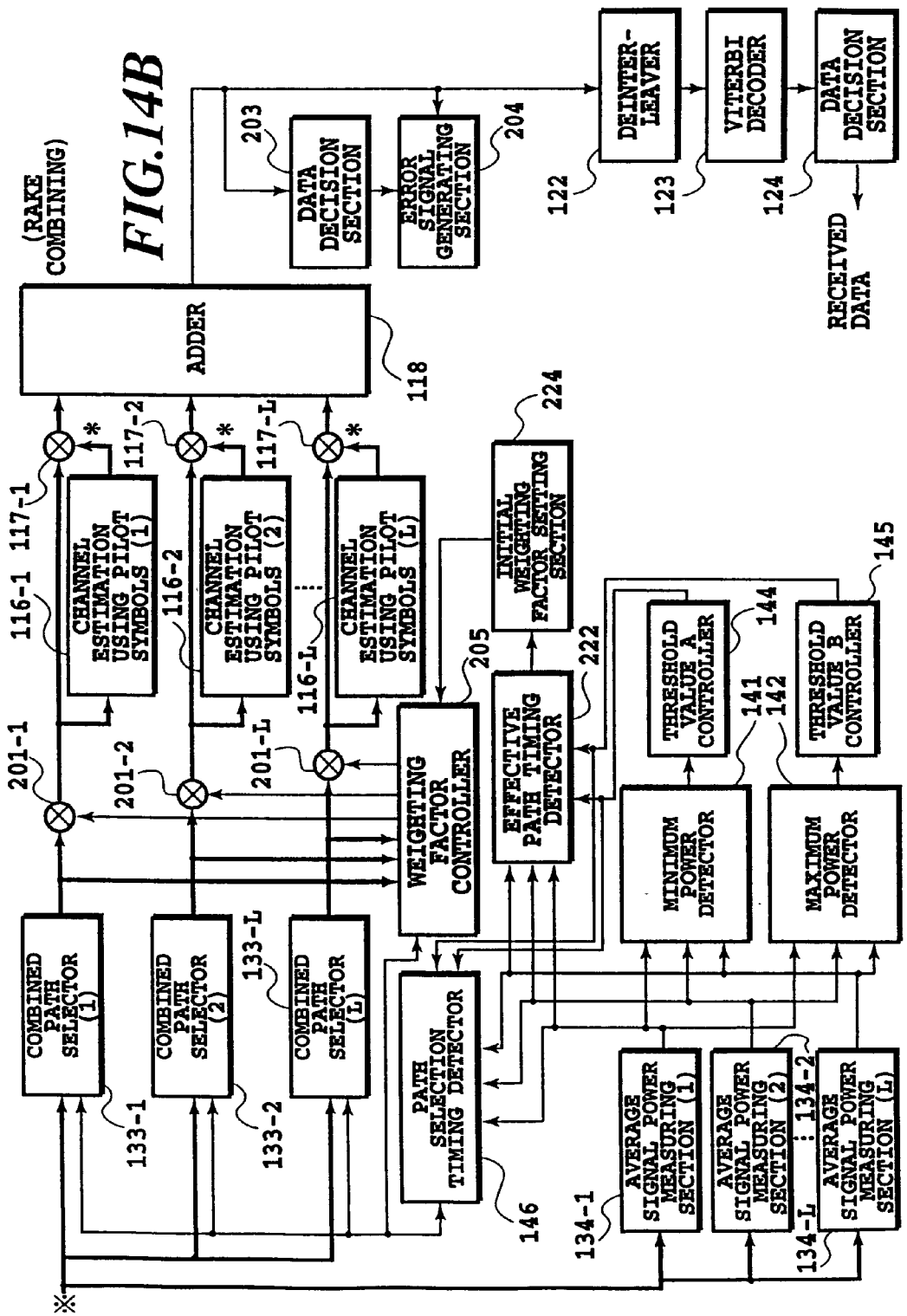

FIGS. 14A and 14B show a configuration of an embodiment of a receiver using embodiments 1 and 5 in accordance with the present invention.

In FIGS. 14A and 14B, the spread modulation signal received is amplified by the low noise amplifier 103, and then undergoes frequency conversion into the IF signal. The IF signal is compensated for its amplitude fluctuations due to fading through the AGC amplifier 107 and the square-law detector 108, followed by the quadrature detection by the quadrature detector 109. The baseband signals output from the quadrature detector 109 are converted into digital signals by the A/D converters 112 and 113. The digital signals are despread by the matched filter 131 with pg taps. Thus, despread signals are output at L (pg×s) timings, where s is the number of over samplings per chip.

The outputs of the matched filter 131 are supplied to average signal power measuring sections 134 to measure respective average signal powers at the L timings. The minimum power detector 141 and maximum power detector 142 detect the minimum signal power and maximum signal power at the L timings, respectively. The threshold value A controller 144 obtains the threshold value A using the minimum signal power detected, and the threshold value B controller 145 obtains the threshold value B using the maximum signal power detected. Here, the threshold value A is a value for preventing the signals consisting of only noise or interference components from being combined, and the threshold value B is a value for selecting signals with sufficient signal power.

The path selection timing detector 146 compares the average signal powers at the L timings with the threshold values A and B, and detects X timings providing the average signal powers equal to or greater than the greater one of the threshold values A and B. The outputs of the matched filter 131 at the X timings thus detected are multiplied by the multipliers 201 by the weighting factors at the corresponding timings output from the weighting factor controller 205, respectively. The outputs of the matched filter 131 selected are supplied to the demodulators 116 and 117 which carry out the absolute coherent detection demodulation using the pilot symbols. The demodulated outputs are RAKE combined by the adder 118. The RAKE combined signal is deinterleaved by the deinterleaver 122, followed by decoding by the Viterbi decoder 123, and then restored to the received data by the data decision section 124.

The data decision section 203 generates the data decision signal from the RAKE combined signal. The error signal generating section 204 generates the error signal (MSE) by calculating the difference between the RAKE combined signal and the data decision signal. The weighting factor controller 205, carrying out the MMSE control using the error signal and the initial value signals at the L timings fed from the initial weighting factor setting section 224, determines the weighting factors at the X timings. In addition, it detects the timing providing the greatest one of the X weighting factors, places the weighting factors at zero at the ±k timings around the detected timing, where k is a natural number, and determines the weighting factors at the entire timings by sequentially detecting the timings providing the next greatest weighting factors, thereby determining the weighing factors at all the timings. The determined weighting factors constitute the outputs of the weighting factor controller 205.

The effective path timing detector 222 compares the average signal powers at the L timings with the threshold values, and detects Y timings providing the average signal powers equal to or greater than the greater one of the threshold values A and B. The initial weighting factor setting section 224 sets at one the initial values of the weighting factors at the Y timings detected by the effective path timing detector 222, and the initial values of the weighting factors at the remaining L–Y timings at zero.

The RAKE receiver as shown in FIGS. 14A and 14B assigns weights obtained through the MMSE control to the signals despread by the matched filter, and then RAKE combines them. This has an advantage of being able to combine only the effective paths even if the number of multipaths varies because of the fluctuations in the delay profiles.

Furthermore, because it measures the average signal powers of the despread signals at all the timings, sets the threshold values from the measured results, and RAKE combines only the signals above the threshold values, it can further reduce the effect of the noise or interference.

Moreover, it can reduce the convergence time of the MMSE because the initial values of the weighting factors at the MMSE are determined in advance.

Configuration of a Receiver Employing Embodiments 2 and 5

Figure 15A:
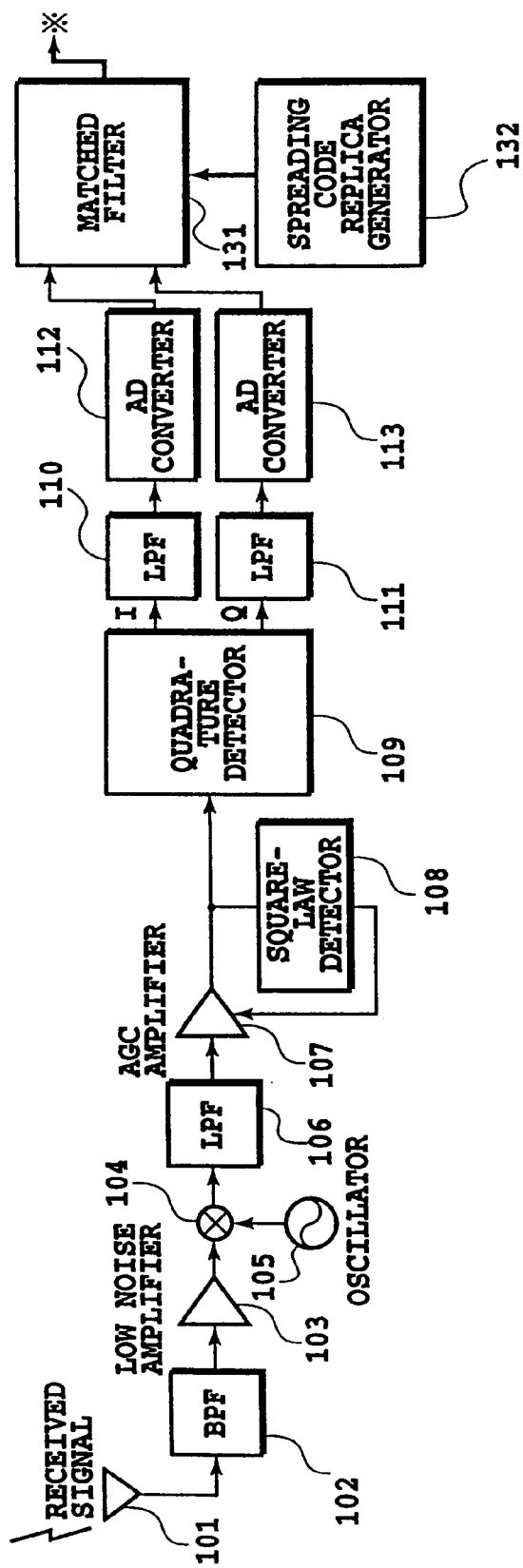
FIGS. 15A and 15B are block diagrams showing a configuration of a DS-CDMA receiver employing the embodiments 2 and 5 in accordance with the present invention.
Figure 15B:
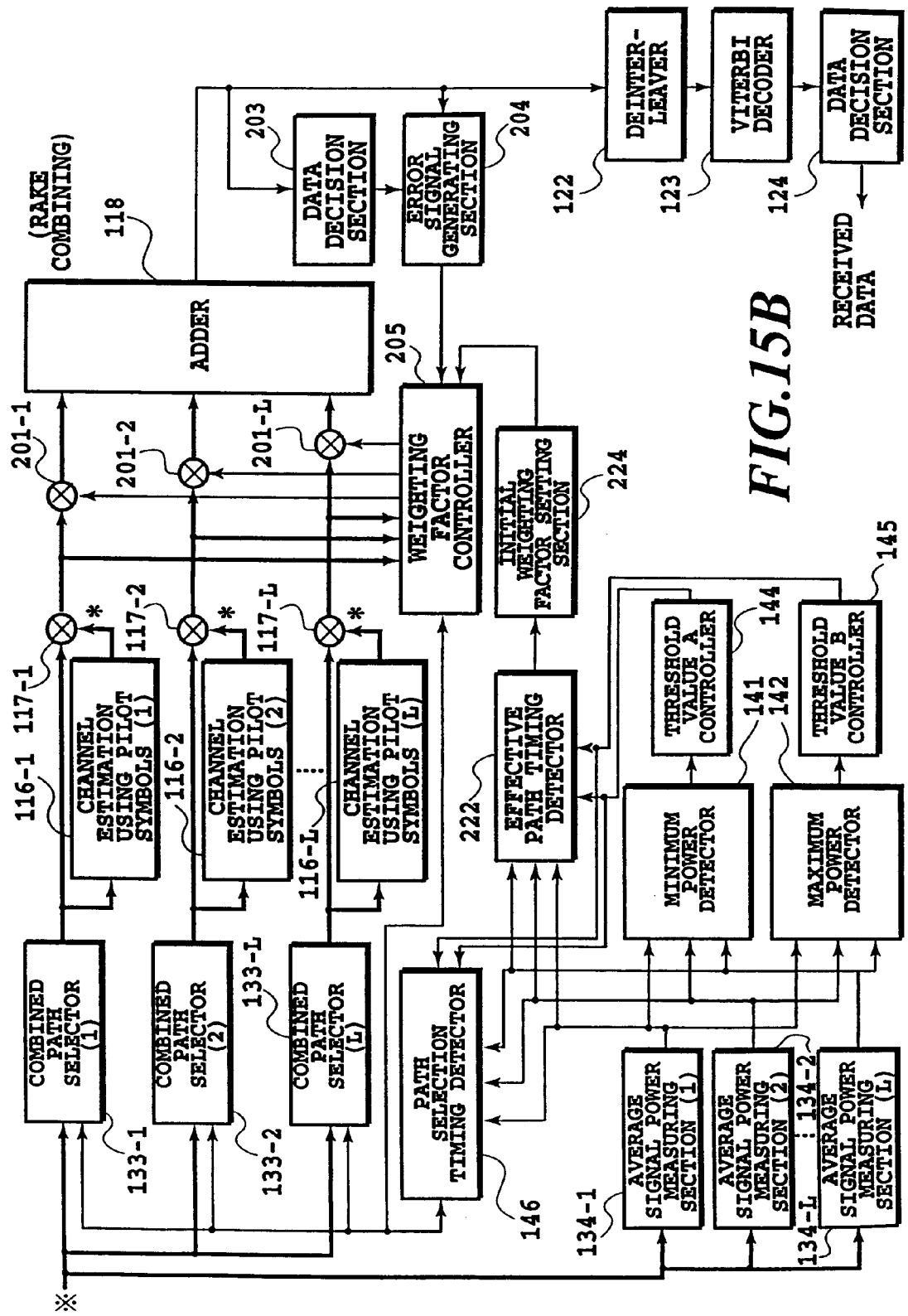
Figure 16A:
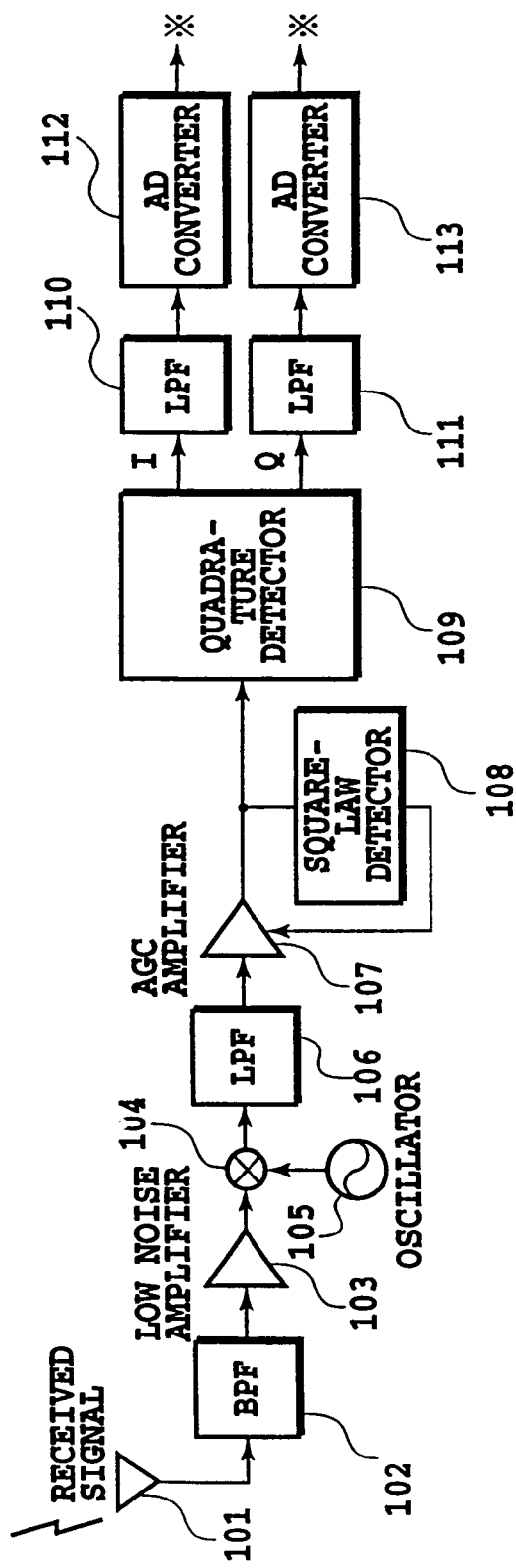
FIGS. 16A and 16B are block diagrams showing a configuration of a conventional DS-CDMA receiver employing sliding correlators.
Figure 16B:
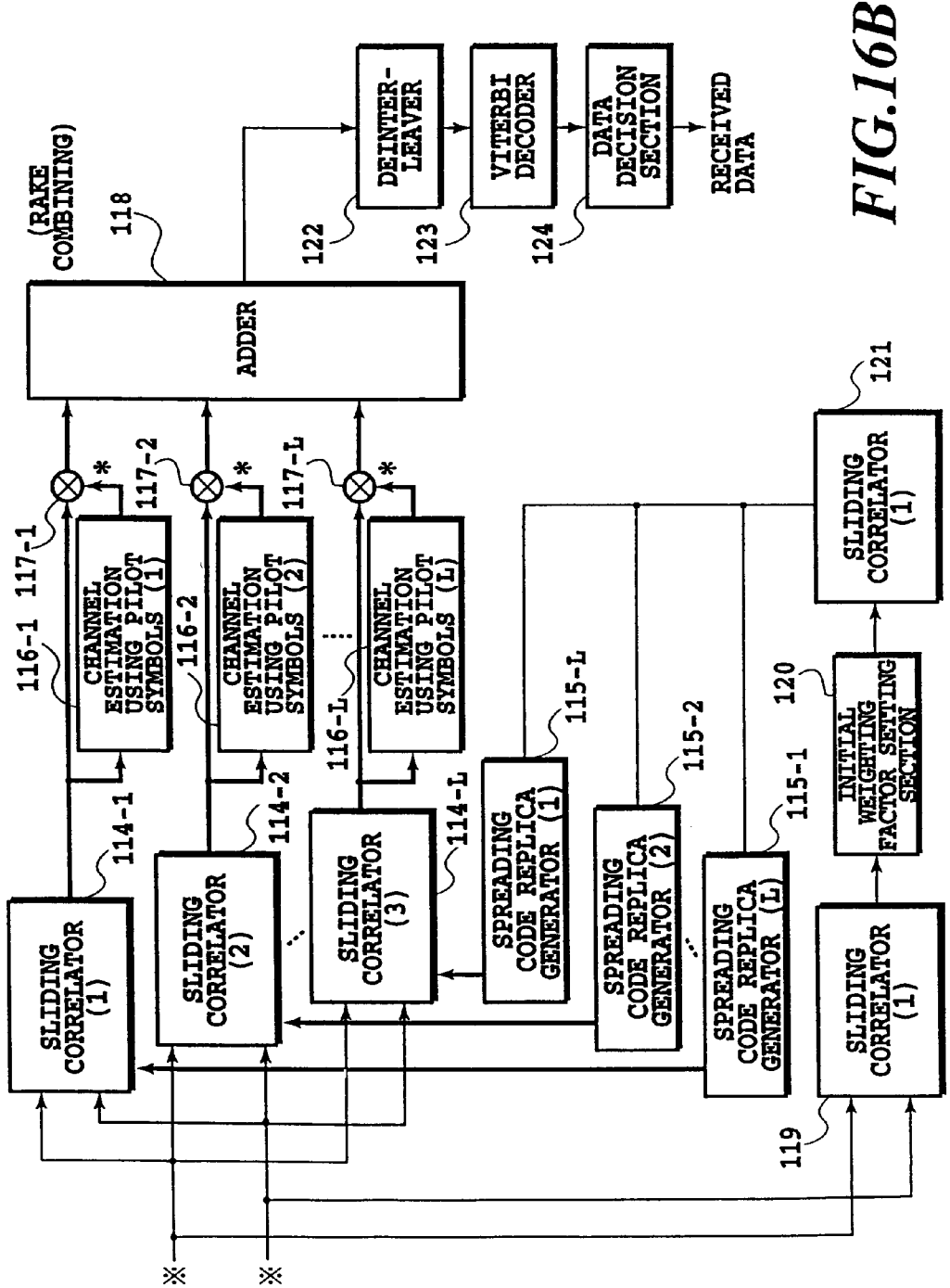
Figure 17A:
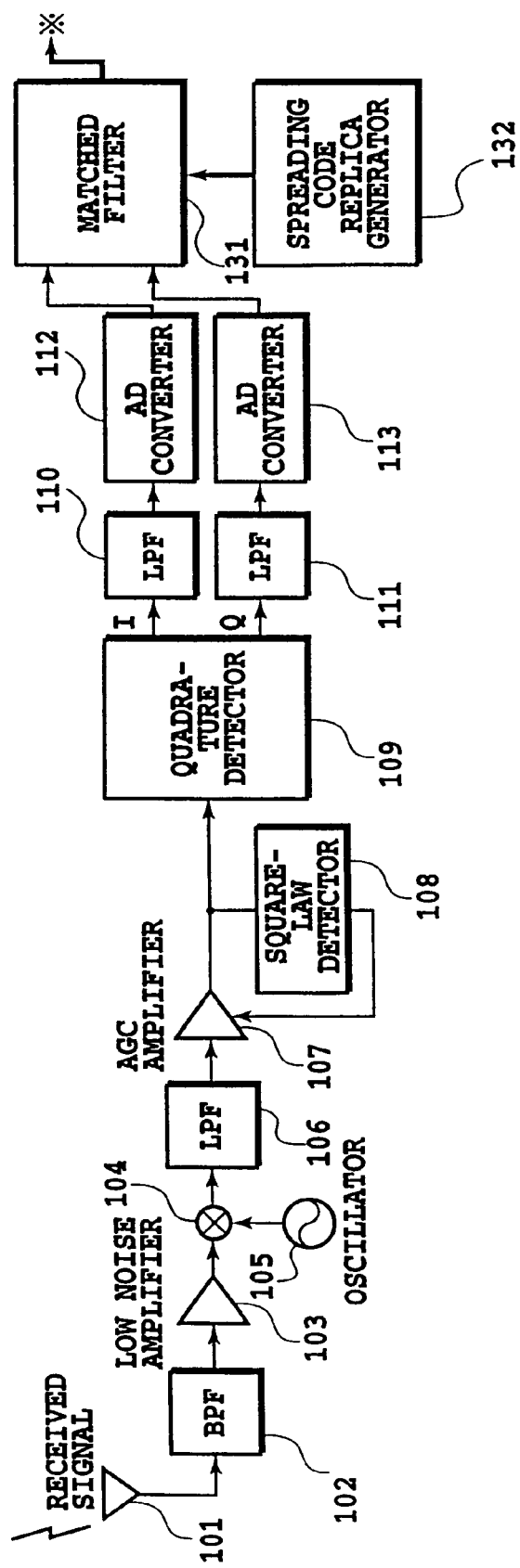
Figure 18A:
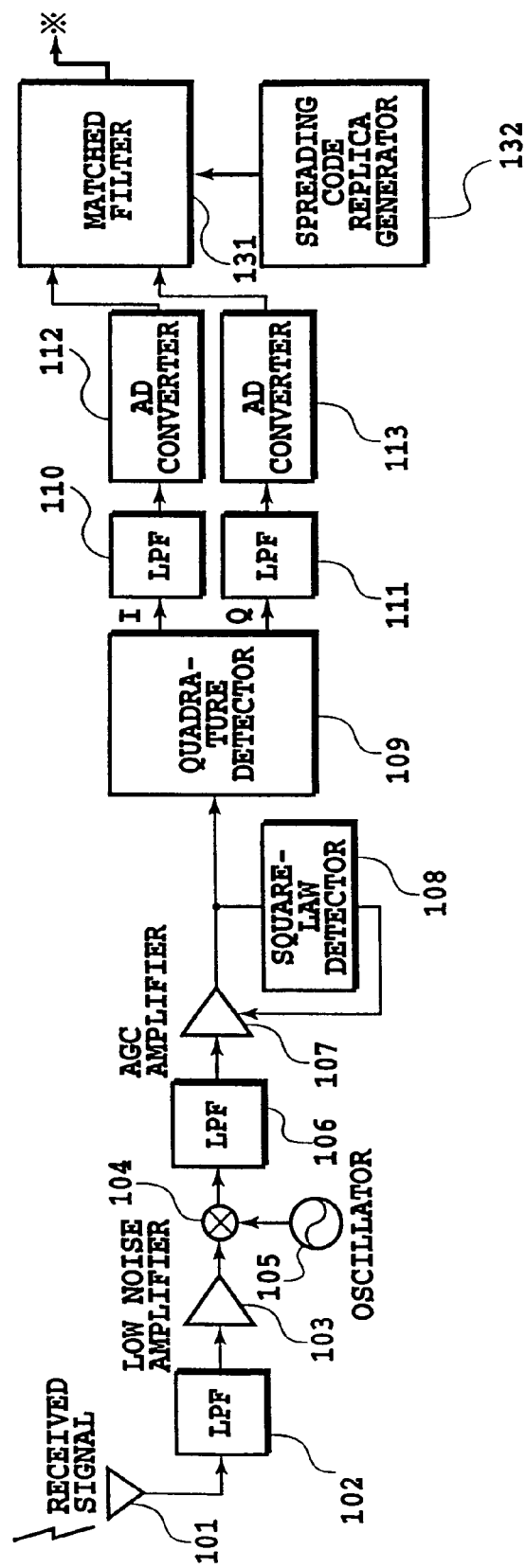
FIGS. 18A and 18B are block diagrams showing a configuration of a DS-CDMA receiver employing a matched filter, which the assignee of the present invention applied for a patent.
Figure 18B:
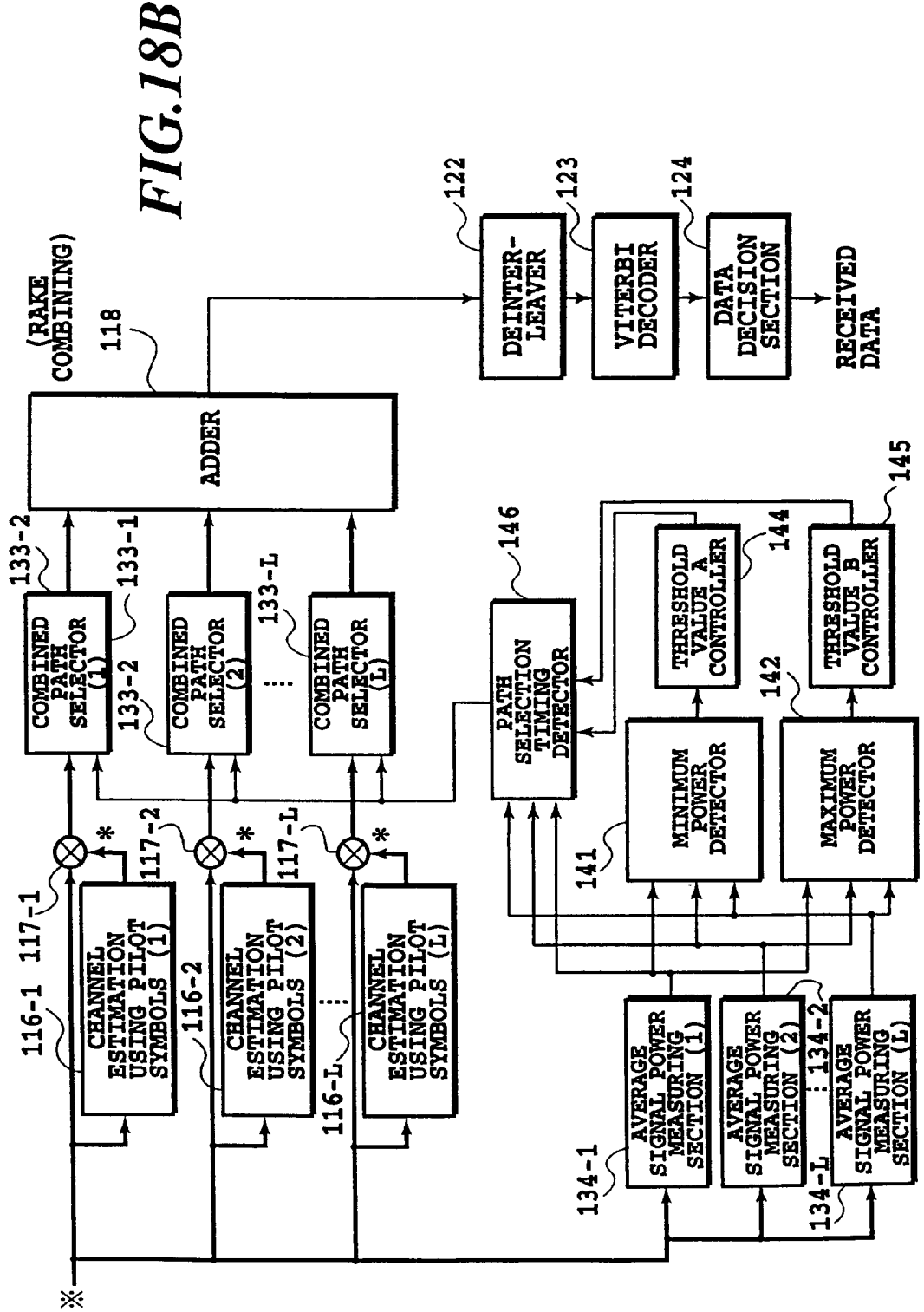
Figure 19:
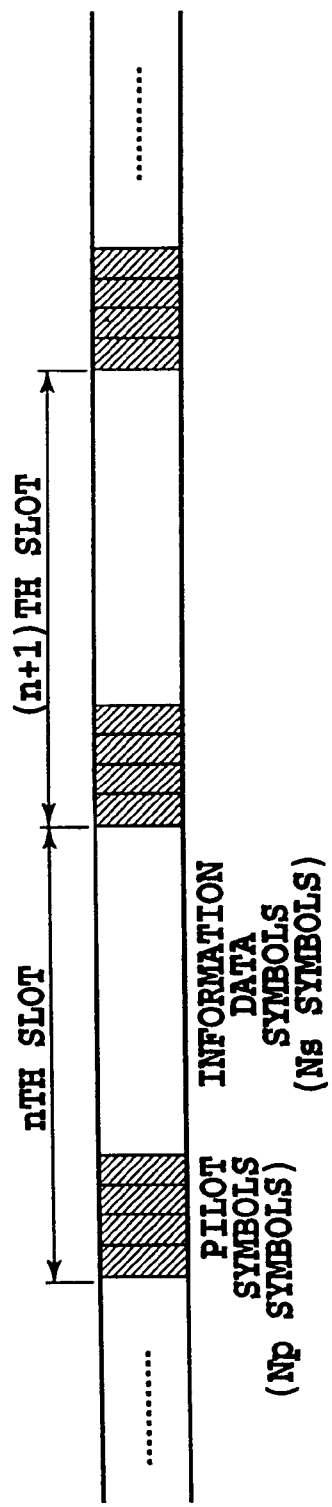
FIG. 19 is a diagram illustrating an example of a frame structure.

FIGS. 15A and 15B show a configuration of an embodiment of a receiver using embodiments 2 and 5 in accordance with the present invention.

In FIGS. 15A and 15B, the spread modulation signal received is amplified by the low noise amplifier 103, and then undergoes frequency conversion into the IF signal. The IF signal is compensated for its amplitude fluctuations due to fading through the AGC amplifier 107 and the square-law detector 108, followed by the quadrature detection by the quadrature detector 109. The baseband signals output from the quadrature detector 109 are converted into digital signals by the A/D converters 112 and 113. The digital signals are despread by the matched filter 131 with pg taps. Thus, despread signals are output at L (pg×s) timings, where s is the number of over samplings per chip.

The average signal power measuring sections 134 measure individual average signal powers at the L timings. The minimum power detector 141 and maximum power detector 142 detect the minimum signal power and maximum signal power at the L timings, respectively. The threshold value A controller 144 obtains the threshold value A using the minimum signal power detected. Here, the threshold value A is a value for preventing the signals consisting of only noise or interference components from being combined. The threshold value B controller 145 obtains the threshold value B using the maximum signal power detected. The threshold value B is a value for selecting signals with sufficient signal power.

The path selection timing detector 146 compares the average signal powers at the L timings with the threshold values A and B, and detects X timings providing the average signal powers equal to or greater than the greater one of the threshold values A and B. The outputs of the matched filter 131 at the X timings thus detected are selected by the combined path selectors 133. The outputs of the matched filter 131 selected are demodulated by the demodulators 116 and 117, and then multiplied by the weighting factors at the corresponding timings output from the weighting factor controller 205 by the multipliers 201, respectively. The weighted outputs of the weighting factor controller 205 are supplied to the demodulators 116 and 117 which carry out the absolute coherent detection demodulation using the pilot symbols. The demodulated outputs are RAKE combined by the adder 118. The RAKE combined signal is deinterleaved by the deinterleaver 122, followed by decoding by the Viterbi decoder 123, and then restored to the received data by the data decision section 124.

The data decision section 203 generates the data decision signal from the RAKE combined signal. The error signal generating section 204 generates the error signal (MSE) by calculating the difference between the RAKE combined signal and the data decision signal. The weighting factor controller 205, carrying out the MMSE control using the error signal and the initial value signals at the L timings fed from the initial weighting factor setting section 224, determines the weighting factors at the X timings. In addition, it detects the timing providing the greatest one of the X weighting factors, places the weighting factors at zero at the ±k timings around the detected timing, where k is a natural number, and sequentially detects the timings providing the next greatest weighting factors, thereby determining the weighing factors at the entire timings. The determined weighting factors constitute the outputs of the weighting factor controller 205.

The initial values of the weighting factors at the start of the MMSE control are determined as follows. First, the outputs of the matched filter 131 are supplied to average signal power measuring sections 134 to measure respective average signal powers at the L timings. The minimum power detector 141 and maximum power detector 142 detect the minimum signal power and maximum signal power at the L timings, respectively. The threshold value A controller 144 obtains the threshold value A using the minimum signal power detected. The threshold value B controller 145 obtains the threshold value B using the maximum signal power detected. Here, the threshold value A is a value for preventing the signals consisting of only noise or interference components from being combined, and the threshold value B is a value for selecting signals with sufficient signal power. The effective path timing detector 222 compares the average signal powers at the L timings with the threshold values A and B, and detects Y timings providing the average signal powers equal to or greater than the greater one of the threshold values A and B. The initial weighting factor setting section 224 sets at one the initial values of the weighting factors at the Y timings detected by the effective path timing detector 222, and the initial values of the weighting factors at the remaining L–Y timings at zero.

The RAKE receiver as shown in FIGS. 15A and 15B assigns the weights obtained through the MMSE control to the signals despread by the matched filter as the receiver as shown in FIGS. 14A and 14B does, and then RAKE combines them. This has an advantage of being able to combine only the effective paths even if the number of multipaths varies because of the fluctuations in the delay profiles.

Furthermore, because it measures the average signal powers of the despread signals at the entire timings, sets the threshold values from the measured results, and RAKE combines only the signals above the threshold values, it can further reduce the effect of the noise or interference.

Moreover, it can reduce the convergence time of the MMSE because the initial values of the weighting factors at the MMSE are determined in advance.

The foregoing configurations of the receiver are examples in accordance with the present invention, and various combinations of the embodiments can be implemented.

The RAKE receiver in accordance with the present invention assigns the weights obtained through the MMSE control to the signals at the entire timings despread by the matched filter, and then RAKE combines them. This has an advantage of being able to combine only the effective paths even if the number of multipaths varies because of the fluctuations in the delay profiles.

Furthermore, according to the present invention, the effect of the noise or interference can be further reduced because the average received powers of the despread signals at all the timings are measured, the threshold values are determined from the minimum value of the average signal powers, and only the despread signals above the threshold value are made candidates of the RAKE combining.

Moreover, according to the present invention, the convergence time of the MMSE can be reduced because the threshold values are determined from the minimum value and maximum value of the average received powers at the entire timings, and only the initial values of the weighting factors are set at one at the timings providing the received powers equal to or greater than the two threshold values.

According to the present invention, the receiving characteristics based on the time diversity effect due to RAKE combining can be improved particularly in a high chip rate, that is, wideband DS-CDMA.

What is claimed is:

1. A RAKE receiver in a direct sequence CDMA transmission system for carrying out multiple access transmission by spreading a modulation signal of information data into a wideband spread modulation signal using a spreading code, said RAKE receiver comprising:

means for receiving the spread modulation signal;

a spreading code replica generator for generating spreading code replicas;

a matched filter with a plurality of output taps for producing a plurality of despread signals by despreading, using spreading code replicas output from said spreading code replica generator, the spread modulation signal received;

an error signal generator for generating an error signal;

a weighting factor controller for generating, from the error signal and the plurality of despread signals fed from said matched filter, weighting factors corresponding to the plurality of despread signals, respectively, and for controlling the weighting factors such that the error signal becomes minimum;

multipliers for multiplying the despreading signals by the corresponding weighting factors fed from said weighting factor controller;

demodulators for demodulating individual outputs from said multipliers;

an adder for combining a plurality of demodulated signals fed from said demodulators; and a reference signal generator for generating a reference signal from an output of said adder, wherein said error signal generator generates the error signal by calculating a difference between the output of said adder and the reference signal.

2. The RAKE receiver as claimed in claim 1, further comprising:

an average signal power measuring section for measuring average received signal powers of the plurality of despread signals fed from said matched filter;

a minimum power detector for detecting a minimum signal power from the plurality of average received signal powers from said average signal power measuring section;

a first threshold value controller for generating, from the minimum signal power fed from said minimum power detector, a first threshold value for selecting paths of signals to be supplied to said adder;

a path selection detector for selecting, by comparing the average received signal powers with the first threshold value, paths whose average received signal powers are equal to or greater than the first threshold value; and a combined path selector for selecting, from among the despread signals fed from said matched filter, signals corresponding to the paths detected by said path selection detector.

3. The RAKE receiver as claimed in claim 2, wherein when said weighting factor controller determines the plurality of weighting factors, it outputs, through control, only weighting factors corresponding to the paths that are detected by said path selection detector.

4. The RAKE receiver as claimed in claim 2, further comprising:

a maximum power detector for detecting a maximum signal power from the plurality of average received signal powers from said average signal power measuring section;

a fourth threshold value controller for generating, from the maximum power detection output fed from said maximum power detector, a fourth threshold value for setting initial values of said weighting factor controller;

an effective path detector for detecting, by comparing the plurality of average received signal powers fed from said average signal power measuring section with the first threshold value and with the fourth threshold value, paths whose average received signal powers are equal to or greater than a greater one of the first threshold value and the fourth threshold value; and an initial weighting factor setting section for placing initial values of the weighting factors corresponding to the paths detected by said effective path detector at a, where $1 \geq \alpha \geq 0$, and for placing initial values of the weighting factors of the remaining paths at zero.

5. The RAKE receiver as claimed in claim 4, wherein said matched filter has pg taps;

said weighting factor controller generates individual weighting factors at pg×s timings corresponding to pg outputs of said matched filter, where s is a number of over samplings per chip;

said average signal power measuring section measures individual average received signal powers a the pg×s timings associated with the outputs of said matched filter, and said minimum power detector detects, from the average received signal powers, the minimum signal power at pg×s timings;

said maximum power detector detects, from the average received signal powers, the maximum signal power at the pg×s timings;

said path selection detector detects timings of the paths, at which the average received signal powers are equal to or greater than the first threshold value; and said effective path detector detects timings, at which the plurality of the average received signal powers are equal to or greater than a greater one of the first threshold value and the fourth threshold value, and said initial weighting factor setting section places the initial values of the weighting factors corresponding to the detected timings at one, and the initial values of the weighting factors of the remaining timings at zero.

6. The RAKE receiver as claimed in claim 2, wherein said matched filter has pg taps;

said weighting factor controller generates individual weighting factors at pg×s timings corresponding to pg outputs of said matched filter, where s is a number of over samplings per chip;

said average signal power measuring section measures individual average received signal powers at the pg×s timings associated with the outputs of said matched filter, and said minimum power detector detects, from the average received signal powers, the minimum signal power at the pg×s timings; and said path selection detector detects timings of the paths, at which the average received signal powers are equal to or greater than the first threshold value.

7. The RAKE receiver as claimed in claim 1, further comprising:

an average signal power measuring section for measuring average received signal powers of the plurality of despread signals fed from said matched filter;

a minimum power detector for detecting a minimum signal power from the plurality of average received signal powers from said average signal power measuring section;

a maximum power detector for detecting a maximum signal power from the plurality of average signal powers from said average signal power measuring section;

a second threshold value controller for generating, from the minimum power detection output fed from said minimum power detector, a second threshold value for setting initial values of said weighting factor controller;

a third threshold value controller for generating, from the maximum power detection output fed from said maximum power detector, a third threshold value for setting initial values of said weighting factor controller;

an effective path detector for detecting, by comparing the plurality of average received signal powers fed from said average signal power measuring section with the second threshold value and with the third threshold value, paths whose average received signal powers are equal to or greater than a greater one of the second threshold value and the third threshold value; and an initial weighting factor setting section for placing initial values of the weighting factors corresponding to the paths detected by said effective path detector at α, where $1 \geq \alpha \geq 0$, and for placing initial values of the weighting factors of the remaining paths at zero.

8. The RAKE receiver as claimed in claim 7, wherein said weighting factor controller determines the initial values of the weighting factors, it sets, as the initial values of the weighting factors corresponding to the paths, the values determined by said initial weighting factor setting section.

9. The RAKE receiver as claimed in claim 7, wherein
said matched filter has pg taps;
said weighting factor controller generates individual weighting factors at pg×s timings corresponding to pg outputs of said matched filter, where s is a number of over samplings per chip;
said average signal power measuring powers at the pg×s timings associated with the outputs of said matched filter, and said minimum power detector detects, from the average received signal powers, the minimum signal power at pg×s timings;
said maximum power detector detects, from the average received signal powers, the maximum signal power at the pg×s timings;
said path selection detector detects timings of the paths, at which the average received signal powers are equal to or greater than the first threshold value; and
said effective path detector detects timings, at which the plurality of the average received signal powers are equal to or greater than a greater one of the second threshold value and the third threshold value, and said initial weighting factor setting section places the initial values of the weighting factors corresponding to the detected timings at one, and the initial values of the weighting factors of the remaining timings at zero.

10. The RAKE receiver as claimed in claim 1, wherein
said matched filter has pg taps; and
said weighting factor controller generates individual weighting factors at pg×s timings corresponding to pg outputs of said matched filter, where s is a number over samplings per chip.

11. The RAKE receiver as claimed in claim 1, wherein said weighting factor controller unconditionally places, when controlling the weighting factors, at zero the weighting factors at ±k timings before and after a timing of said matched filter providing the maximum withing factor, where k is a natural number, and sequentially determines the weighting factors by detecting a timing providing a next greatest weighting factor.

12. A RAKE receiver in a direct sequence CDA transmission system for carrying out multiple access transmission by spreading a modulation signal of information data into a wideband spread modulation signal using a spreading code, said RAKE receiver comprising:
means for receiving the spread modulation signal;
a spreading code replica generator for generating spreading code replicas;
a matched filter with a plurality of output taps for producing a plurality of despread signals by despreading, using spreading code replicas output from said spreading code replica generator, the spread modulation signal received;
demodulators for demodulating the plurality of despread signals fed from said matched filter, respectively;
an error signal generator for generating an error signal;
a weighting factor controller for generating weighting factors corresponding to a plurality of demodulation signals fed from said demodulators, and for controlling the weighting factors such that the error signal becomes minimum;
multipliers for multiplying the demodulation signals fed from said demodulators by the corresponding weighting factors fed from said weighting factor controller;
an adder for combining a plurality of outputs fed from said multipliers; and
a reference signal generator for generating a reference signal from an output of said adder,
wherein said error signal generator generates the error signal by calculating a difference between the output of said adder and the reference signal.

13. The RAKE receiver as claimed in claim 12, further comprising:
an average signal power measuring section for measuring average received signal powers of the plurality of despread signals fed from said matched filter;
a minimum power detector for detecting a minimum signal power from the plurality of average received signal powers from said average signal power measuring section;
a first threshold value controller for generating, from the minimum signal power fed from said minimum power detector, a first threshold value for selecting paths of signals to be supplied to said adder;
a path selection detector for selecting, by comparing the average received signal powers with the first threshold value, paths whose average received signal powers are equal to or greater than the first threshold value; and
a combined path selector for selecting, from among the despread signals fed from said matched filter, signals corresponding to the paths detected by said path selection detector.

14. The RAKE receiver as claimed in claim 13, wherein when said weighting factor controller determines the plurality of weighting factors, it outputs, through control, only weighting factors corresponding to the paths that are detected by said path selection detector.

15. The RAKE receiver as claimed in claim 13, further comprising:
a maximum power detector for detecting a maximum signal power from the plurality of average received signal powers from said average signal power measuring section;
a fourth threshold value controller for generating, from the maximum power detection output fed from said maximum power detector, a fourth threshold value for setting initial values of said weighting factor controller;
an effective path detector for detecting, by comparing the plurality of average received signal powers fed from said average signal power measuring section with the first threshold value and with the fourth threshold value, paths whose average received signal powers are equal to or greater than a greater one of the first threshold value and the fourth threshold value; and
an initial weighting factor setting section for placing initial values of the weighting factors corresponding to the paths detected by said effective path detector at a, where $1 \geq \alpha \geq 0$, and for placing initial values of the weighting factors of the remaining paths at zero.

16. The RAKE receiver as claimed in claim 15, wherein
said matched filter has pg taps;
said weighting factor controller generates individual weighting factors at pg×s timings corresponding to pg outputs of said matched filter, where s is a number of over samplings per chip;
said average signal power measuring section measures individual average received signal powers a the pg×s timings associated with the outputs of said matched filter, and said minimum power detector detects, from the average received signal powers, the minimum signal power at pg×s timings;

said maximum power detector detects, from the average received signal powers, the maximum signal power at the pg×s timings;

said path selection detector detects timings of the paths, at which the average received signal powers are equal to or greater than the first threshold value; and said effective path detector detects timings, at which the plurality of the average received signal powers are equal to or greater than a greater one of the first threshold value and the fourth threshold value, and said initial weighting factor setting section places the initial values of the weighting factors corresponding to the detected timings at one, and the initial values of the weighting factors of the remaining timings at zero.

17. The RAKE receiver as claimed in claim 13, wherein said matched filter has pg taps;

said weighting factor controller generates individual weighting factors at pg×s timings corresponding to pg outputs of said matched filter, where s is a number of over samplings per chip;

said average signal power measuring section measures individual average received signal powers at the pg×s timings associated with the outputs of said matched filter, and said minimum power detector detects, from the average received signal powers, the minimum signal power at the pg×s timings; and said path selection detector detects timings of the paths, at which the average received signal powers are equal to or greater than the first threshold value.

18. The RAKE receiver as claimed in claim 12, further comprising:

an average signal power measuring section for measuring average received signal powers of the plurality of despread signals fed from said matched filter;

a minimum power detector for detecting a minimum signal power from the plurality of average received signal powers from said average signal power measuring section;

a maximum power detector for detecting a maximum signal power from the plurality of average signal powers from said average signal power measuring section;

a second threshold value controller for generating, from the minimum power detection output fed from said minimum power detector, a second threshold value for setting initial values of said weighting factor controller;

a third threshold value controller for generating, from the maximum power detection output fed from said maximum power detector, a third threshold value for setting initial values of said weighting factor controller;

an effective path detector for detecting, by comparing the plurality of average received signal powers fed from said average signal power measuring section with the second threshold value and with the third threshold value, paths whose average received signal powers are equal to or greater than a greater one of the second threshold value and the third threshold value; and an initial weighting factor setting section for placing initial values of the weighting factors corresponding to the paths detected by said effective path detector at a, where $1 \geq \alpha \geq 0$, and for placing initial values of the weighting factors of the remaining paths at zero.

19. The RAKE receiver as claimed in claim 18, wherein said weighting factor controller determines the initial values of the weighting factors, it sets, as the initial values of the weighting factors corresponding to the paths, the values determined by said initial weighting factor setting section.

20. The RAKE receiver as claimed in claim 18, wherein said matched filter has pg taps;

said weighting factor controller generates individual weighting factors at pg×s timings corresponding to pg outputs of said matched filter, where s is a number of over samplings per chip;

said average signal power measuring powers at the pg×s timings associated with the outputs of said matched filter, and said minimum power detector detects, from the average received signal powers, the minimum signal power at pg×s timings;

said maximum power detector detects, from the average received signal powers, the maximum signal power at the pg×s timings;

said path selection detector detects timings of the paths, at which the average received signal powers are equal to or greater than the first threshold value; and said effective path detector detects timings, at which the plurality of the average received signal powers are equal to or greater than a greater one of the second threshold value and the third threshold value, and said initial weighting factor setting section places the initial values of the weighting factors corresponding to the detected timings at one, and the initial values of the weighting factors of the remaining timings at zero.

21. The RAKE receiver as claimed in claim 12, wherein said matched filter has pg taps; and said weighting factor controller generates individual weighting factors at pg×s timings corresponding to pg outputs of said matched filter, where s is a number over samplings per chip.

22. The RAKE receiver as claimed in any one of claim 12, wherein said weighting factor controller unconditionally places, when controlling the weighting factors, at zero the weighting factors at ±k timings before and after a timing of said matched filter providing the maximum weighting factor, where k is a natural number, and sequentially determines the weighting factors by detecting a timing providing a next greatest weighting factor.

* * * * *